US009541459B2

(12) United States Patent
Shida

(10) Patent No.: US 9,541,459 B2
(45) Date of Patent: Jan. 10, 2017

(54) OPTICAL FIBER TEMPERATURE DISTRIBUTION MEASUREMENT DEVICE AND METHOD OF MEASURING OPTICAL FIBER TEMPERATURE DISTRIBUTION

(71) Applicant: YOKOGAWA ELECTRIC CORPORATION, Musashino-shi, Tokyo (JP)

(72) Inventor: Hideo Shida, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 392 days.

(21) Appl. No.: 14/185,314

(22) Filed: Feb. 20, 2014

(65) Prior Publication Data

US 2014/0241396 A1    Aug. 28, 2014

(30) Foreign Application Priority Data

Feb. 28, 2013   (JP) ................................. 2013-038696

(51) Int. Cl.
*G01K 11/32* (2006.01)

(52) U.S. Cl.
CPC ......... *G01K 11/32* (2013.01); *G01K 2011/324* (2013.01)

(58) Field of Classification Search
CPC .... G01K 11/32; G01K 2011/324; G01D 5/268
USPC .......................................... 374/161, E11.015
See application file for complete search history.

(56) References Cited

U.S. PATENT DOCUMENTS

| 5,028,146 A * | 7/1991 | Wada ...................... G01K 11/32 374/129 |
| 5,217,306 A | 6/1993 | Wada |
| 5,449,233 A * | 9/1995 | Sai .......................... G01K 11/32 250/227.14 |
| 2003/0021528 A1 * | 1/2003 | Fredin ................ G01M 11/3109 385/31 |

(Continued)

FOREIGN PATENT DOCUMENTS

| JP | 11-174267 A | 7/1999 |
| JP | 2002-278585 A | 9/2002 |
| JP | 2012-27001 A | 2/2012 |

*Primary Examiner* — Lisa Caputo
*Assistant Examiner* — Philip Cotey
(74) *Attorney, Agent, or Firm* — Sughrue Mion, PLLC

(57) ABSTRACT

An optical fiber temperature distribution measurement device configured to receive Raman back scattering lights obtained by inputting a pulsed light into an optical fiber and to measure a temperature distribution along a longitudinal direction of the optical fiber is provided. The device includes a first filter device. The first filter device includes: a threshold value setting circuit configured to set a threshold value in accordance with a change in an amount of noise overlapped with a measured signal, the measured signal indicating one of an intensity distribution and a temperature distribution of the Raman back scattering lights along the longitudinal direction of the optical fiber; a filter configured to eliminate a frequency component of the measured signal, the frequency component being larger than a predetermined first frequency; a determination circuit configured to determine if the measured signal is over the threshold value; a synthesizing circuit configured to select and synthesize one of the measured signal processed by the filter and the measured signal unprocessed by the filter in accordance with a determination result from the determination circuit.

17 Claims, 10 Drawing Sheets

(56) References Cited

U.S. PATENT DOCUMENTS

| | | | | |
|---|---|---|---|---|
| 2006/0018586 A1* | 1/2006 | Kishida | G01B 11/16 | 385/12 |
| 2006/0210269 A1* | 9/2006 | Farhadiroushan | G01D 5/35364 | 398/48 |
| 2007/0258087 A1* | 11/2007 | Ogura | G01K 11/32 | 356/301 |
| 2007/0280329 A1* | 12/2007 | Kawauchi | G01J 5/08 | 374/131 |
| 2008/0068586 A1* | 3/2008 | Kishida | G01B 11/18 | 356/32 |
| 2010/0220765 A1* | 9/2010 | Martinelli | G01K 11/32 | 374/161 |
| 2010/0276576 A1* | 11/2010 | Martinelli | G01K 11/32 | 250/227.23 |
| 2011/0044371 A1* | 2/2011 | Lee | G01M 11/319 | 374/161 |
| 2011/0228255 A1* | 9/2011 | Li | G01B 11/18 | 356/33 |
| 2011/0310925 A1* | 12/2011 | Agawa | G01K 11/32 | 374/161 |
| 2012/0033293 A1* | 2/2012 | Zaacks | H01S 3/0014 | 359/341.3 |
| 2012/0033709 A1* | 2/2012 | Kasajima | G01K 11/32 | 374/161 |
| 2012/0328297 A1* | 12/2012 | Hoshida | H04J 14/02 | 398/85 |
| 2013/0100984 A1* | 4/2013 | Agawa | G01K 11/32 | 374/161 |
| 2013/0188176 A1* | 7/2013 | Lovely | G01D 5/353 | 356/73.1 |

* cited by examiner

OPTICAL FIBER TEMPERATURE DISTRIBUTION MEASUREMENT DEVICE AND METHOD OF MEASURING OPTICAL FIBER TEMPERATURE DISTRIBUTION

BACKGROUND OF THE INVENTION

1. Field of the Invention

The present invention relates to an optical fiber temperature distribution measurement device configured to measure a temperature distribution of an optical fiber along a longitudinal direction of the optical fiber, and a method of measuring an optical fiber temperature distribution.

Priority is claimed on Japanese Patent Application No. 2013-038696, filed Feb. 28, 2013, the content of which is incorporated herein by reference.

2. Description of Related Art

There have been widely carried out research and developments regarding distribution measurement devices configured to use optical fiber as sensors and to measure the distribution of a physical quantity of optical fiber, wherein the distribution is defined in the longitudinal direction of the optical fiber. One of the distribution measurement devices is an optical fiber temperature distribution measurement device which is configured to measure a temperature distribution along the longitudinal direction of the optical fiber by measuring Raman back scattering light (Stokes light and anti-Stokes light) generated in the optical fiber. The optical fiber temperature distribution measurement device is also referred to as R-OTDR (Raman Optical Time Domain Reflectometry).

Specifically, the optical fiber temperature distribution measurement device described above is configured to repeatedly supplying a pulse of laser via a side of the optical fiber into the optical fiber and sequentially receiving Raman back scattering lights (Stokes light and anti-Stokes light) from the side of the optical fiber, where the Raman back scattering light is generated by propagating the pulse of laser in the optical fiber. The temperature distribution along the longitudinal direction of the optical fiber is obtained by calculating the intensity ratio of the Stokes light to the anti-Stokes light at each measuring point along the longitudinal direction of the optical fiber (to be exact, by calculating the ratio of the average value of the intensity of the Stokes light to the average value of the intensity of the anti-Stokes light).

Japanese Unexamined Patent Application, First Publication No. 2012-27001 discloses an example of an optical fiber temperature distribution measurement device in the related art. Japanese Unexamined Patent Application, First Publication No. 2002-278585 and Japanese Unexamined Patent Application, First Publication No. H11-174267 disclose a technique for eliminating noises in the related art. Specifically, Japanese Unexamined Patent Application, First Publication No. 2002-278585 discloses a noise elimination device configured to eliminate small-amplitude random noises (specifically, noises included in a sound signal such as a human voice and a music). Japanese Unexamined Patent Application, First Publication No. H11-174267 discloses a non-linear digital filter for an optical pulse tester configured to reduce the amount of noises overlapped with an OTDR waveform.

Indexes indicating a performance of an optical fiber temperature distribution measurement device include a "temperature resolution" and a "spatial resolution". The "temperature resolution" is an index indicating the minimum measurable temperature difference, while the "spatial resolution" is an index indicating the minimum fiber length needed to measure a certain temperature change. For example, SEAFOM (Subsea Fiber Optic Monitoring Group) defines the average of $2\sigma$ as the "temperature resolution", where a is the standard deviation of measured values obtained by repeatedly measuring an optical fiber having a constant temperature twenty times (measurement results at measuring points more than 51 points), and defines the minimum fiber length needed to measure a hot spot (a spot where a temperature difference is over 20° C.) as the "spatial resolution".

Recently, improvements of the temperature resolution and the spatial resolution have made it necessary for optical fiber temperature distribution measurement devices to measure a temperature distribution more precisely. Especially, requirements for a correct measurement of a temperature distribution at a distant position from the optical fiber temperature distribution measurement device (for example, at a position which is closer to a first end than to a second end opposite to the first end, a laser is incident into the second end) are increased. Thus, it is necessary to improve the temperature resolution at the position near one side of the fiber.

Since the temperature resolution relates to an S/N ratio which is the ratio of a signal component (a received signal of Raman back scattering light) to a noise component, it is necessary to increase the level of the signal component or to decrease the level of the noise component in order to improve the temperature resolution. Methods of increasing the level of the signal component include a method of increasing the intensity of a laser input into the optical fiber. Methods of decreasing the level of the noise component include a method of narrowing a band of an optical filter used to separate the Raman back scattering light (Stokes light and anti-Stokes light) (a first method), and a method of performing a filtering process in the related art for the received signal of the received Raman back scattering light (a second method).

In the method of increasing the level of the signal component, when the intensity of the laser input into the optical fiber is larger than a certain value, stimulated Raman scattering is generated in the optical fiber and the intensity of the Stokes light increases rapidly. Thus, the measurement error of the temperature increases. In the first method of decreasing the level of the noise component, since there are limitations to the technique of narrowing the band of the optical filter, the improvements of the temperature resolution is not expected much. In addition, the optical filter is more expensive than an electrical filter.

In the second method of decreasing the level of the noise component, the noise component can be decreased using a simple filter of the related art, but the waveform of the signal component may be degraded. Thus, it is not easy to improve the temperature resolution. The degradation of the waveform of the signal component is caused by the facts that the waveform of the signal component obtained by measuring the optical fiber varies in accordance with the measuring condition, and that a noise overlapped with the signal component is a white noise (a noise including various frequency components).

An aspect of the present invention provides an optical fiber temperature distribution measurement device which enables the temperature resolution to be improved.

SUMMARY

According to one aspect of the present invention, an optical fiber temperature distribution measurement device configured to receive Raman back scattering lights obtained by inputting a pulsed light into an optical fiber and to measure a temperature distribution along a longitudinal direction of the optical fiber is provided. The optical fiber temperature distribution measurement device may include a first filter device. The first filter device may include: a threshold value setting circuit configured to set a threshold value in accordance with a change in an amount of noise overlapped with a measured signal, the measured signal indicating one of an intensity distribution and a temperature distribution of the Raman back scattering lights along the longitudinal direction of the optical fiber; a filter configured to eliminate a frequency component of the measured signal, the frequency component being larger than a predetermined first frequency; a determination circuit configured to determine if the measured signal is over the threshold value; a synthesizing circuit configured to select and synthesize one of the measured signal processed by the filter and the measured signal unprocessed by the filter in accordance with a determination result from the determination circuit.

In the optical fiber temperature distribution measurement device described above, the threshold value setting circuit may be configured to set several sections of the optical fiber, and to set threshold values for the sections, respectively.

In the optical fiber temperature distribution measurement device described above, if the determination result from the determination circuit indicates that the measured signal is not over the threshold value, the synthesizing circuit may select and synthesize the measured signal processed by the filter, and if the determination result from the determination circuit indicates that the measured signal is over the threshold value, the synthesizing circuit may select and synthesize the measured signal unprocessed by the filter.

In the optical fiber temperature distribution measurement device described above, if the determination results from the determination circuit which indicate that the measured signal is over the threshold value are successively obtained, the synthesizing circuit may select and synthesize the measured signal unprocessed by the filter for a predetermined term regardless of the determination results from the determination circuit.

In the optical fiber temperature distribution measurement device described above, the threshold value setting circuit may be configured to calculate an average of absolute values of differences between neighboring measured signals, and to set a value obtained by multiplying the average by a predetermined constant as the threshold value, and the neighboring measured signals indicate the intensity distribution or the temperature distribution of the Raman back scattering lights generated at neighboring sampling points among sampling points set along the longitudinal direction of the optical fiber.

In the optical fiber temperature distribution measurement device described above, the first filter device may further include a first delay circuit configured to delay the measured signal by a time needed to perform a process in the filter. If the determination result from the determination circuit indicates that the measured signal is over the threshold value, the synthesizing circuit may select and synthesize the delayed measured signal output from the first delay circuit.

In the optical fiber temperature distribution measurement device described above, the first filter device may further include a reducing circuit configured to reduce a level of the measured signal processed by the filter and to input the reduced measured signal to the synthesizing circuit.

In the optical fiber temperature distribution measurement device described above, the optical fiber temperature distribution measurement device may further include: a spare filter device configured to extract an outline of the measured signal; a first operation circuit configured to subtract a processing result of the spare filter device from the measured signal and to input the subtracted signal to the first filter device as the measured signal; and a second operation circuit configured to add the processing result of the spare filter device and a processing result of the first filter device.

In the optical fiber temperature distribution measurement device described above, the spare filter device may include: a spare filter configured to eliminate a spare frequency component of the measured signal, the spare frequency component being larger than a predetermined second frequency; a spare threshold value setting circuit configured to set a spare threshold value in accordance with an average of absolute values of differences between the measured signal processed by the spare filter and the measured signal unprocessed by the spare filter; a spare determination circuit configured to determine if the measured signal is over the spare threshold value; and a spare synthesizing circuit configured to select and synthesize one of the measured signal processed by the spare filter and the measured signal unprocessed by the spare filter in accordance with a spare determination result from the spare determination circuit.

In the optical fiber temperature distribution measurement device described above, if the spare determination result from the spare determination circuit indicates that the measured signal is not over the spare threshold value, the spare synthesizing circuit may select and synthesize the measured signal processed by the spare filter, and if the spare determination result from the spare determination circuit indicates that the measured signal is over the spare threshold value, the spare synthesizing circuit may select and synthesize the measured signal unprocessed by the spare filter.

In the optical fiber temperature distribution measurement device described above, the spare filter device may further include a first spare delay circuit configured to delay the measured signal by a time needed to perform a process in the spare filter. If the spare determination result from the spare determination circuit indicates that the measured signal is over the spare threshold value, the spare synthesizing circuit may select and synthesize the delayed measured signal output from the first spare delay circuit.

In the optical fiber temperature distribution measurement device described above, the spare filter device may further include a second spare delay circuit configured to delay the measured signal by a time, which is obtained by adding the time needed to perform the process in the spare filter and a time needed to perform a process in the spare synthesizing circuit.

In the optical fiber temperature distribution measurement device described above, the optical fiber temperature distribution measurement device may further include a second delay circuit configured to delay a processing result of the spare filter device by a time needed to perform a process in the first filter device.

In the optical fiber temperature distribution measurement device described above, the second delay circuit may be in connection with the second operation circuit. The second operation circuit may be configured to add a processing result delayed by the second delay circuit and the processing result of the first filter device.

In the optical fiber temperature distribution measurement device described above, the optical fiber temperature distribution measurement device may further include: a second filter device having the same configuration as that of the first filter device; a third operation circuit configured to subtract the processing result of the first filter device from the measured signal output from the first operation circuit and to input the subtracted signal to the second filter device as the measured signal; and a fourth operation circuit configured to add a processing result of the second filter device and a processing result of the second operation circuit.

According to another aspect of the present invention, a method of measuring an optical fiber temperature distribution is provided. The method may include: a first threshold value setting step setting a first threshold value in accordance with a change of an amount of noise overlapped with a measured signal, the measured signal indicating one of an intensity distribution and a temperature distribution of Raman back scattering lights along a longitudinal direction of an optical fiber, the Raman back scattering lights obtained by inputting a pulsed light into the optical fiber; a first eliminating step eliminating a frequency component included in a part of the measured signal, the frequency component being larger than a predetermined first frequency; a first determining step determining if the measured signal is over the first threshold value; a first synthesizing step selecting and synthesizing one of the measured signal processed by the first eliminating step and the measured signal unprocessed by the first eliminating step in accordance with a determination result from the first determining step; and a measuring step measuring a temperature distribution along a longitudinal direction of the optical fiber using data synthesized in the first synthesizing step.

In the method of measuring the optical fiber temperature distribution described above, the first threshold value setting step may include separating the optical fiber into several sections, and setting the threshold value at each of the sections.

In the method of measuring the optical fiber temperature distribution described above, if the determination result from the first determining step indicates that the measured signal is not over the first threshold value, the first synthesizing step may select and synthesize the measured signal processed by the first eliminating step, and if the determination result from the first determining step indicates that the measured signal is over the first threshold value, the first synthesizing step may select and synthesize the measured signal unprocessed by the first eliminating step.

In the method of measuring the optical fiber temperature distribution described above, the method may further include, before the first threshold value setting step; a first outline extracting step extracting an outline of the measured signal; and a first subtracting step subtracting a processing result of the first outline extracting step from the measured signal. The method may further include, after the first synthesizing step, a first adding step adding the processing result of the first outline extracting step and a processing result of the first synthesizing step.

In the method of measuring the optical fiber temperature distribution described above, the method may further include, after the first synthesizing step; a second subtracting step subtracting the processing result of the first synthesizing step from a processing result of the first subtracting step; a second threshold value setting step setting a second threshold value in accordance with a change of an amount of noise overlapped with a processing result of the second subtracting step; a second eliminating step eliminating a frequency component included in a part of the processing result of the second subtracting step, the frequency component being larger than a predetermined frequency; a second determining step determining if the processing result of the second subtracting step is over the second threshold value; a second synthesizing step selecting and synthesizing one of the processing result of the second subtracting step processed by the second eliminating step and the processing result of the second subtracting step unprocessed by the second eliminating step in accordance with a determination result from the second determining step; and a second adding step adding a processing result of the second synthesizing step and a processing result of the first adding step. The measuring step may measure the temperature distribution along the longitudinal direction of the optical fiber using data added in the second adding step instead of the data synthesized in the first synthesizing step.

According to an aspect of the present invention, one of the measured signal processed by the filter and the measured signal unprocessed by the filter is selected and synthesized depending on whether the measured signal which indicates the intensity distribution or the temperature distribution of the Raman back scattering light along the longitudinal direction of the optical fiber is over the threshold value set in accordance with the change in the amount of noise overlapped with the measured signal. Thus, the noise components having a high spatial frequency can be effectively reduced without degrading the waveform of the signal component, and the temperature resolution can be improved.

DETAILED DESCRIPTION OF THE INVENTION

Hereinafter, an optical fiber temperature distribution measurement device in accordance with one embodiment of the present invention will be described with reference to the drawings.

(First Embodiment)

Figure 1:
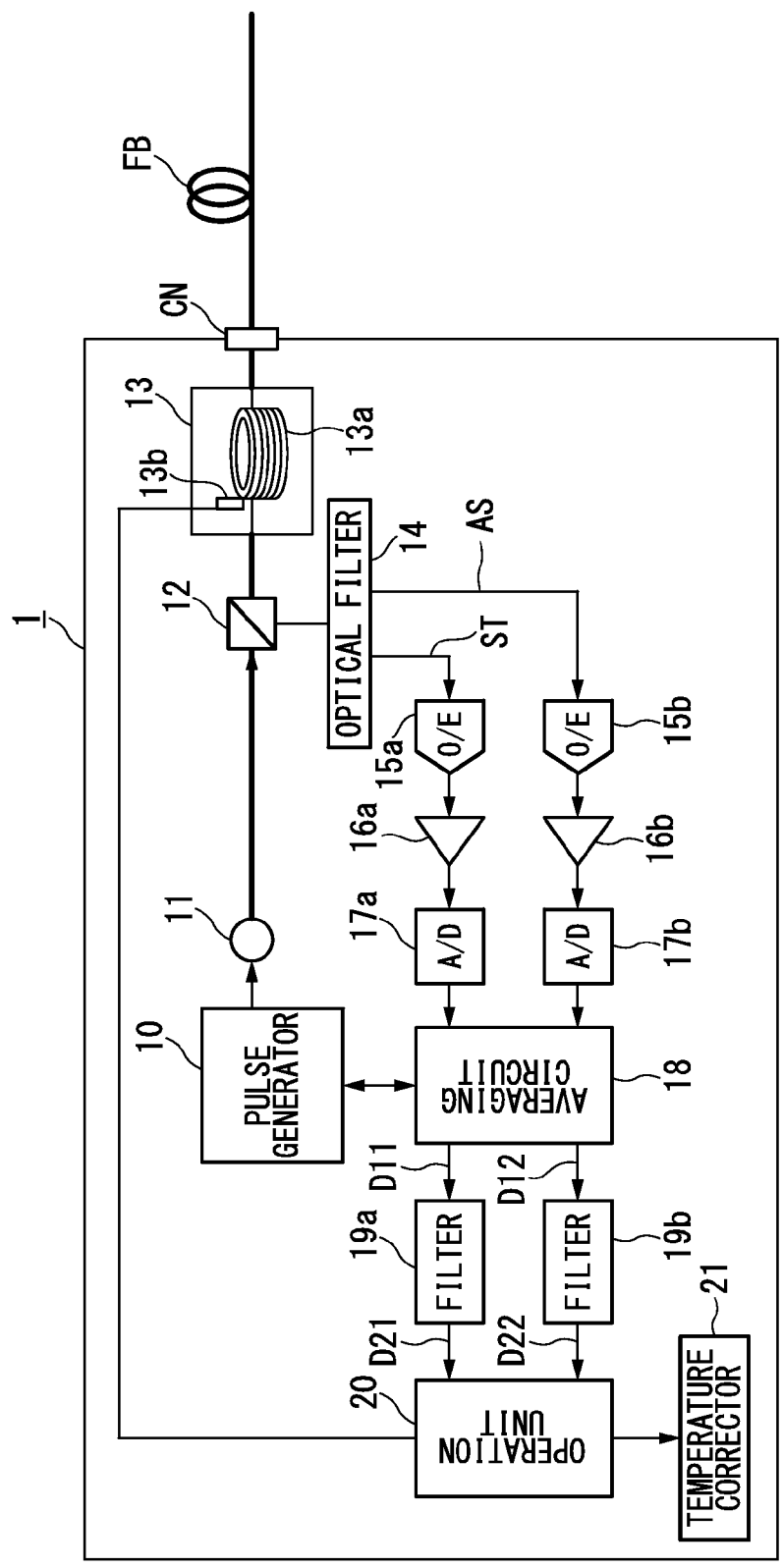
FIG. 1 is a block diagram illustrating main components of an optical fiber temperature distribution measurement device in accordance with a first embodiment of the present invention.

FIG. 1 is a block diagram illustrating main components of an optical fiber temperature distribution measurement device in accordance with a first embodiment of the present invention. As illustrated in FIG. 1, an optical fiber temperature distribution measurement device 1 in accordance with the first embodiment includes a pulse generator 10, a light source 11, a directional coupler 12, a temperature reference unit 13, an optical filter 14, photoelectric conversion circuits (O/E) 15a and 15b, amplifier circuits 16a and 16b, A/D conversion circuits 17a and 17b, an averaging circuit 18, filters 19a and 19b, an operation unit 20, and a temperature corrector 21.

The optical fiber temperature distribution measurement device 1 is an optical fiber measurement device (R-OTDR) which is configured to receive Raman back scattering lights (Stokes light and anti-Stokes light) generated in an optical fiber FB in connection with a connector CN and to measure a temperature distribution along a longitudinal direction of the optical fiber FB. A silica based multi-mode optical fiber which has a length of, for example, approximately several kilometers to several tens of kilometers may be used as the optical fiber FB. A single-mode optical fiber may also be used as the optical fiber FB.

The pulse generator 10 is configured to output pulse signals which define a timing to generate pulsed light from the light source 11 and a timing to operate the averaging circuit 18. The light source 11 includes, for example, a semiconductor laser, etc., and is configured to output a pulse of laser at the timing of the output of the pulsed signals from the pulse generator 10. A wavenumber of the laser output from the light source 11 is defined as k0. The directional coupler 12 is configured to optically connect the light source 11, the temperature reference unit 13, and the light filter 14 so that the laser output from the light source 11 is directed to the temperature reference unit 13 and the back scattering light generated in the optical fiber FB is directed to the optical filter 14.

The temperature reference unit 13 includes a winding optical fiber 13a and a temperature sensor 13b, and is configured to determine the temperature (the reference temperature) inside the optical fiber temperature distribution measurement device 1. One end of the optical fiber 13a is optically in connection with the directional coupler 12, while the other end of the optical fiber 13a is optically in connection with the connector CN (one end of the optical fiber FB is in connection with the connector). The optical fiber 13a has an entire length of approximately several tens to several hundreds of meters. The temperature sensor 13b includes, for example, a platinum resistance temperature detector, and is configured to measure a temperature near the optical fiber 13a. Measuring results of the temperature sensor 13b are input into the operation unit 20.

The optical filter 14 is configured to extract the Raman back scattering light (the Stokes light ST and the anti-Stokes light AS) included in the back scattering light from the directional coupler 12, and to separate and output the Stokes light and the anti-Stokes light. Given Raman shift (wavenumber) generated in the optical fiber FB is defined as kr, the wavenumber of the Stokes light ST is represented by k0+kr and the wavenumber of the anti-Stokes light AS is represented by k0+kr.

Each of the photoelectric conversion circuits 15a and 15b includes a light receiving element, for example, an avalanche photodiode, etc., and is configured to photoelectrically convert each of the Stokes light ST and the anti-Stokes light AS output from the optical filter 14. Each of the amplifier circuits 16a and 16b is configured to amplifier photoelectric conversion signals at a predetermined amplification factor, wherein the photoelectric conversion signals are output from the photoelectric conversion circuits 15a and 15b.

Each of the A/D conversion circuits 17a and 17b is configured to sample the photoelectric conversion signals amplified by the amplifier circuits 16a and 16b, and output a digitized sample data. The operation timings of the A/D conversion circuits 17a and 17b are defined so that the A/D conversion circuits 17a and 17b sample the photoelectric conversion signals of the Raman back scattering light (the Stokes light ST and the anti-Stokes light AS) generated at sampling points (measuring points). The sampling points are set at constant intervals (for example, at intervals of 1 meter) along the longitudinal direction of the optical fiber FB. The position of the connector CN is defined as an origin.

The averaging circuit 18 is configured to operate in accordance with the pulsed signals from the pulse generator 10, and to individually average each of the sample data from the A/D conversion circuits 17a and 17b. The sample data are obtained every time the laser output several times from the light source 11 is input into the optical fiber FB. Since the Raman back scattering light (the Stokes light ST and the anti-Stokes light AS) generated in the optical fiber FB is weak, a desired ratio of a signal to a noise (S/N ratio) is obtained by averaging the sample data, wherein the sample data are obtained by inputting several times the laser into the optical fiber FB.

The filter 19a is configured to filter sample data D11 of the A/D conversion circuit 17a averaged by the averaging circuit 18 (a measured signal indicating an intensity distribution of the Stokes light ST) and to eliminate noises included in the sample data D11. In a similar way, the filter 19b is configured to filter sample data D12 of the A/D conversion circuit 17b averaged by the averaging circuit 18 (a measured signal indicating an intensity distribution of the anti-Stokes light AS) and to eliminate noises included in the sample data D12. The filters 19a and 19b are provided to improve the temperature resolution of the optical fiber temperature distribution measurement device 1. More details on the filters 19a and 19b will be described later.

The operation unit 20 is configured to calculate an intensity ratio at each of the sampling points using the sample data D21 of the Stokes light ST filtered by the filter 19a and the sample data D22 of the anti-Stokes light AS filtered by the filter 19b with reference to the measurement results of the temperature sensor 13b. For example, the operation unit 20 is configured to calculate an intensity ratio of the anti-Stokes light AS to the Stokes light ST (the intensity of the anti-Stokes light AS/the intensity of the Stokes light ST). Since the intensity ratio varies depending on a change in temperature, the temperature at each of the sampling points is obtained by this calculation. Thereby the temperature distribution along the longitudinal direction of the optical fiber FB is obtained. The temperature corrector 21 is configured to correct the temperature distribution along the longitudinal direction of the optical fiber FB obtained by the operation unit 20 in accordance with measurement results of a temperature sensor (not illustrated) configured to measure the temperature of the optical fiber FB.

Figure 2:
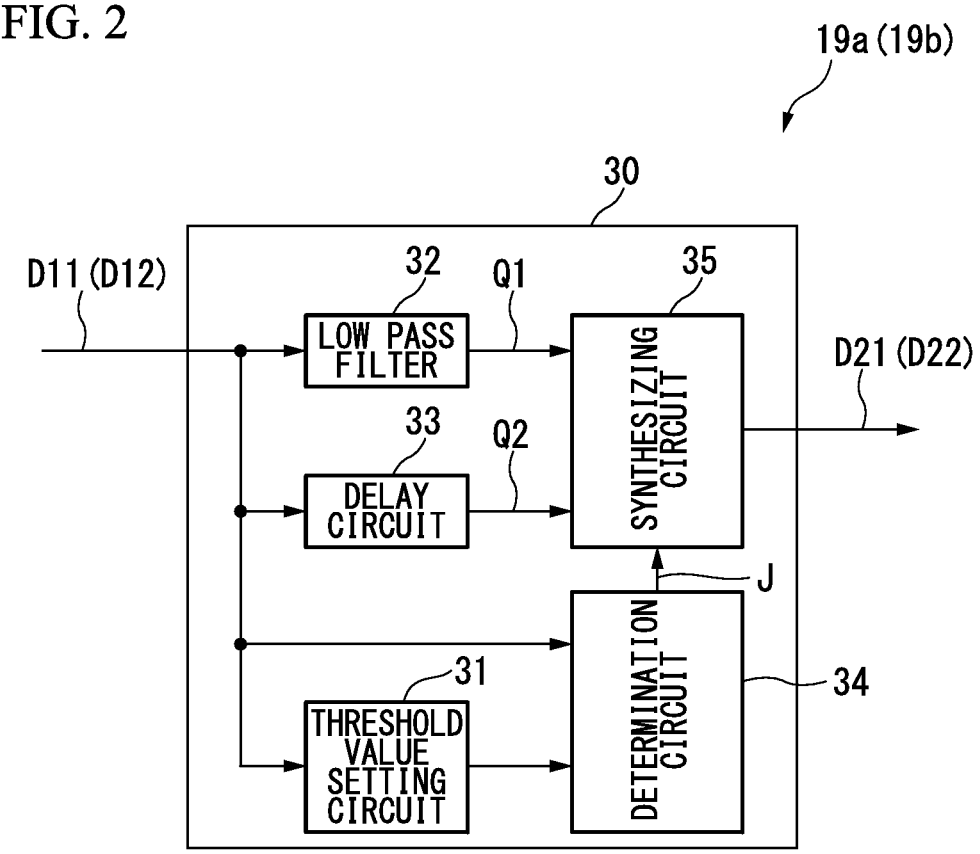
FIG. 2 is a block diagram illustrating internal components of a filter included in the optical fiber temperature distribution measurement device in accordance with the first embodiment of the present invention.

Next, internal components of the filters 19a and 19b will be described. FIG. 2 is a block diagram illustrating the internal components of the filter included in the optical fiber temperature distribution measurement device in accordance with the first embodiment of the present invention. As illustrated in FIG. 2, each of the filters 19a and 19b includes a filter device 30. The filter device 30 includes a threshold value setting circuit 31, a low pass filter 32 (a filter), a delay circuit 33, a determination circuit 34, and a synthesizing circuit 35.

The filter device 30 included in the filter 19a is configured to filter the sample data D11 output from the averaging circuit 18 to eliminate the noise of the sample data D11, and to output resulted sample data D21. The filter device 30 included in the filter 19b is configured to filter the sample data D12 output from the averaging circuit 18 to eliminate the noise of the sample data D12, and to output resulted sample data D22. Hereinafter, in order to avoid redundant descriptions, only the filter device 30 included in the filter 19a will be described in detail, meanwhile descriptions of the filter device 30 included in the filter 19b are omitted.

The threshold setting circuit 31 is configured to set a threshold value TH1 used for the filtering performed by the filter device 30. Specifically, the threshold setting circuit 31 is configured to set the threshold value TH1 in accordance with the change in the amount of noise overlapped with the sample data D11. Given i-th data among the sample data D11 is represented by X(i), the threshold setting circuit 31 is configured to calculate the threshold value TH1 in accordance with a following equation (1) using successive (N+1) data. In the following equation (1), α is arbitrary constant (for example, "2").

$$TH1 = \alpha \times \frac{1}{N} \sum_i |X(i+1) - X(i)| \quad (1)$$

The threshold value setting circuit 31 is configured to obtain the threshold value TH1 by multiplying the average of the absolute values of the differences between neighboring data (the number of the differences is N) by the constant α, wherein the neighboring data are obtained at the neighboring sampling points. The sample data D11 include a component resulting from the Stokes light ST and a component resulting from the noise. If the temperature of the optical fiber FB is constant, the components resulting from the Stokes light ST included in the data (the neighboring data) are almost the same, wherein the data (the neighboring data) are obtained at the neighboring sampling points. Thus, the change in the amount of noise is obtained by calculating the difference between the neighboring data. Thus, the threshold value TH1 calculated by the equation (1) can be described as the threshold value in accordance with the change in the amount of noise.

The threshold value setting circuit 31 is configured to set several sections of the optical fiber FB, and to set the threshold values TH1 for the sections, respectively. For example, the threshold value setting circuit 31 is configured to set several sections of the optical fiber FB, wherein each of the sections has a length of 100 meters. If the sampling points are set at intervals of 1 meter along the longitudinal direction of the optical fiber FB, each of the sections having the length of 100 meters includes 101 sampling points, which include the sampling points at both ends of the section. Thus, regarding each of the sections, the threshold value setting circuit 31 is configured to calculate the threshold value TH1 in accordance with the equation (1) using successive 101 data (N=100) obtained at 101 sampling points.

Figure 3:
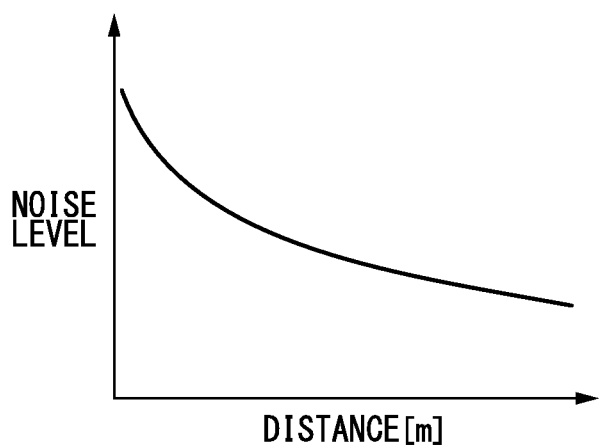
FIG. 3 is a diagram illustrating a summary of a distribution characteristic of a noise.

The reason why the several sections are set for the optical fiber FB and the threshold value TH1 is set at each of the sections is to consider distribution characteristic of the noise. In addition, the reason is that the change in the amount of noise varies significantly in accordance with individual differences of the optical fiber FB and the usage environment of the optical fiber FB. FIG. 3 is a diagram illustrating a summary of the distribution characteristic of the noise. In FIG. 3, the horizontal axis indicates the distance along the longitudinal direction of the optical fiber FB (the distance from the optical fiber temperature distribution measurement device 1), and the vertical axis indicates the level of the noise. As illustrated in FIG. 3, the distribution characteristic of the noise indicates that the level and the change in the amount of noise are large near the optical fiber temperature distribution measurement device 1, and the level and the change in the amount of noise gradually decrease with the distance from the optical fiber temperature distribution measurement device 1. Thus, since the change in the amount of noise is quite different depending on the position of the optical fiber FB, the threshold value TH1 is set for each of the sections.

The low pass filter 32 is configured to eliminate a frequency component of the sample data D11 which is larger than a predetermined Cutoff frequency (a first frequency). The low pass filter 32 is provided to eliminate noise components having a high spatial frequency along the longitudinal direction of the optical fiber FB. The Cutoff frequency of the low pass filter 32 is appropriately set in accordance with the needed temperature resolution.

The delay circuit 33 is configured to delay the input sample data D11 by a predetermined time. Specifically, the delay circuit 33 is configured to delay the sample data D11 by the time needed to perform the process in the low pass filter 32. The delay circuit 33 is provided to adjust the timing to input data Q1 processed by the low pass filter 32 into the synthesizing circuit 35 and the timing to input data Q2 (the sample data D11) unprocessed by the low pass filter 32 into the synthesizing circuit 35. If such a timing adjustment is unnecessary, the delay circuit 33 may be omitted.

The determination circuit 34 is configured to determine if each of the sample data D11 is over the threshold value TH1 set by the threshold value setting circuit 31, and to input determination results J into the synthesizing circuit 35. In accordance with the determination results J from the determination circuit 34, the synthesizing circuit 35 is configured to select one of the data Q1 processed by the low pass filter 32 and the data Q2 unprocessed by the low pass filter 32, and synthesize the selected data. Specifically, if the determination result J from the determination circuit 34 indicates that the sample data D11 is not over the threshold value TH1, the synthesizing circuit 35 selects the data Q1 processed by the low pass filter 32 and synthesizes the data Q1. On the other hand, if the determination result J from the determination circuit 34 indicates that the sample data D11 is over the threshold value TH1, the synthesizing circuit 35 selects the data Q2 unprocessed by the low pass filter 32 and synthesizes the data Q2.

Given a determination result from the determination circuit 34 for i-th data X(i) among the sample data D11 is J(i), a data to be selected and synthesized by the synthesizing circuit 35 in accordance with the determination result J(i) is Y(i), and a transfer function of the low pass filter 32 is H(z), the filter device 30 illustrated in FIG. 2 is represented by a following equation (2). If X(i) is over the threshold value TH1, the determination result J(i)=1. On the other hand, if X(i) is not over the threshold value TH1, the determination result J(i)=0. The following equation (2) indicates that the filter device 30 is an ϵ filter.

$$Y(i)=X(i)J(i)+H(z)X(i)(1-J(i))  \quad (2)$$

If the determination results J, which indicate that the sample data D11 is over the threshold value TH1, are successively obtained, the synthesizing circuit 35 selects and synthesizes the data Q2 unprocessed by the low pass filter 32 for a predetermined term regardless the determination results J. Specifically, regarding three data before and after the determination results, which indicates that the sample data D11 is over the threshold value TH1, are successively obtained, the synthesizing circuit 35 selects and synthesizes the data Q2 unprocessed by the low pass filter 32. The reason for performing such a process is to prevent a possible degradation of the spatial resolution when the temperature of the optical fiber FB varies rapidly. The synthesizing circuit 35 includes a memory configured to temporarily store the data Q2, etc. The processes described above are realized by appropriately reading out the data stored in the memory.

Figure 4A:
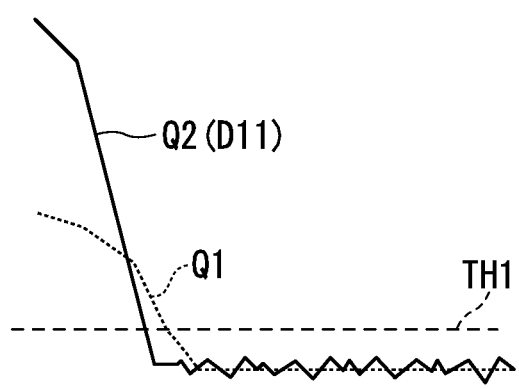
FIG. 4A is a diagram illustrating a process in a determination circuit of the filter included in the optical fiber temperature distribution measurement device in accordance with the first embodiment of the present invention.
Figure 4B:
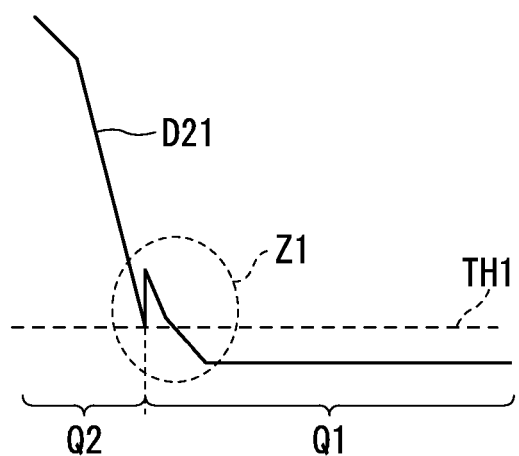
FIG. 4B is a diagram illustrating the process in the determination circuit of the filter included in the optical fiber temperature distribution measurement device in accordance with the first embodiment of the present invention.
Figure 4C:
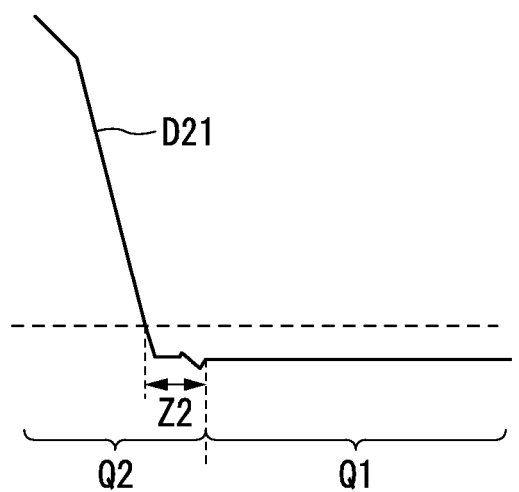
FIG. 4C is a diagram illustrating the process in the determination circuit of the filter included in the optical fiber temperature distribution measurement device in accordance with the first embodiment of the present invention.

FIGS. 4A to 4C are diagrams illustrating a process in the determination circuit of the filter included in the optical fiber temperature distribution measurement device in accordance with the first embodiment of the present invention. If the temperature of the optical fiber FB varies rapidly, the signal level of the sample data D11 output from the averaging circuit 18 (the data Q2 input into the synthesizing circuit 35) rapidly decreases with the reduction of the temperature and falls below the threshold value TH1, as illustrated in FIG. 4A. The variation of the signal level of the data (the data Q1 input into the synthesizing circuit 35), which is obtained by processing the sample data D11 by the low pass filter 32, is more gradual than that of the data Q2, as illustrated in FIG. 4A.

As described above, if a data selection from the data Q1 and the data Q2 is performed depending only on whether each of the sample data D11 is over the threshold vale TH1, the data Q2 is selected until the sample data 11 falls below the threshold value TH1, then the data Q1 is selected after the sample data 11 falls below the threshold value TH1. As illustrated in FIG. 4B, the data synthesized by the synthesizing circuit 35 (the sample data D21 ) include a discontinuous section (the section indicated by a circle of a reference number Z1), and the signal waveform of the data degrades. Thereby, there is a possibility that the spatial resolution degrades.

On the other hand, since the selection method of the data Q1 and Q2 is changed when the determination results J, which indicate that the sample data D11 is over the threshold value TH1, are successively obtained as described above, the data Q2 is selected after the sample data 11 fall below the threshold value TH1, as illustrated in FIG. 4C (a section indicated by an arrow of a reference number Z2). As illustrated in FIG. 4C, a continuity of the data synthesized by the synthesizing circuit 35 (the sample data D21) is retained and the signal waveform does not degrade. Therefore, the degradation of the spatial resolution can be prevented.

Next, operations of the optical fiber temperature distribution measurement device 1 in accordance with the first embodiment will be described. Hereinafter, in order to facilitate understanding of the first embodiment, sampling points are set at intervals of 1 meter along the longitudinal direction of the optical fiber FB, several sections are set for the optical fiber FB by the process of the filters 19a and 19b. Each of the sections has a length of 100 meters.

After the operations are started, pulsed signals are output from the pulse generator 10, pulses of laser are output from the light source 11 in accordance with the pulsed signals. The laser inputs into the optical fiber FB through the directional coupler 12, the temperature reference unit 13, and the connector CN in this order, and propagates through the optical fiber FB. The back scattering light including the Raman back scattering light (the Stokes light ST and the anti-Stokes light AS) is generated by the movement of the laser through the optical fiber FB. In the optical fiber FB, the back scattering light moves in a direction against the moving direction of the laser, and is input into the optical filter 14 through the connector CN, the temperature reference unit 13, and the directional coupler 12 in this order. The Stokes light ST and the anti-Stokes light AS are extracted and separated by the optical filter 14.

The Stokes light ST and the anti-Stokes light AS are photoelectrically converted by the photoelectric conversion circuits 15a and 15b, respectively. The photoelectric conversion signal obtained by photoelectrically converting the Stokes light ST and the photoelectric conversion signal obtained by photoelectrically converting the anti-Stokes light AS are amplified by the amplifier circuits 16a and 16b, respectively. The photoelectric conversion signal amplified by the amplifier circuit 16a and the photoelectric conversion signal amplified by the amplifier circuit 16b are sampled by the A/D conversion circuits 17a and 17b, respectively. The sample data sampled by the A/D conversion circuits 17a and 17b are input into the averaging circuit 18. Each of the sample data corresponding to the number of the sampling points set along the longitudinal direction of the optical fiber FB is stored in the averaging circuit 18.

The processes described above are repeated every time the pulse of laser is input into the optical fiber FB, and the sample data corresponding to the number of the sampling points are sequentially output from each of the A/D conversion circuits 17a and 17b. The sample data with regard to the Stoke light ST, which are sequentially output from the A/D conversion circuit 17a, are averaged by the averaging circuit 18 at every sampling point, while the sample data with regard to the anti-Stoke light AS, which are sequentially output from the A/D conversion circuit 17b, are averaged by the averaging circuit 18 at every sampling point.

After the averaging process by the averaging circuit 18 is finished, the sample data are filtered by the filers 19a and 19b to eliminate noises included in the averaged sample data. The filtering process is performed at every section set in the optical fiber FB. When the filtering processes of the filters 19a and 19b are started, first, the sample data at 101 sampling points (including the sampling points at both ends of the section) included in the first section (the section closest to the optical fiber temperature distribution measurement device 1) among the several sections set in the optical fiber FB are read out by each of the filters 19a and 19b to set the threshold value TH1.

Specifically, first 101 data among the sample data (the sample data D11) with regard to the Stoke light ST averaged by the averaging circuit 18 are read out by the filter 19a, while first 101 data among the sample data (the sample data D12) with regard to the anti-Stoke light AS averaged by the averaging circuit 18 are read out by the filter 19b. The threshold value TH1 is calculated using the equation (1) described above, and the calculated threshold value TH1 is set by the threshold value setting circuit 31 of the filter device 30 provided in each of the filters 19a and 19b.

Next, the sample data of 100 sampling points included in the first section are sequentially read out by the filters 19a and 19b one by one, and the noises included in these sample data are eliminated. Specifically, the first 100 data among the sample data D11 are sequentially read out by the filter 19a one by one, while the first 100 data among the sample data D12 are sequentially read out by the filter 19b one by one. The noises included in these data are eliminated by the filters 19a and 19b. Since the process performed in the filters 19a and 19b are similar to each other, hereinafter, only the process performed in the filter 19a will be described.

The data read out by the filter 19a are input into the low pass filter 32, the delay circuit 33, and the determination circuit 34 of the filter device 30 provided in the filter 19a. The high frequency components are eliminated by the low pass filter 32, while the data are delayed by the delay circuit 33 by a predetermined time, and each of the data Q1 and Q2 output from the low pass filter 32 and the delay circuit 33 is input into the synthesizing circuit 35. The determination circuit 34 determine if the input data are over the threshold value set by the threshold value setting circuit 31, and the determination results J are input into the synthesizing circuit 35.

Figure 5:
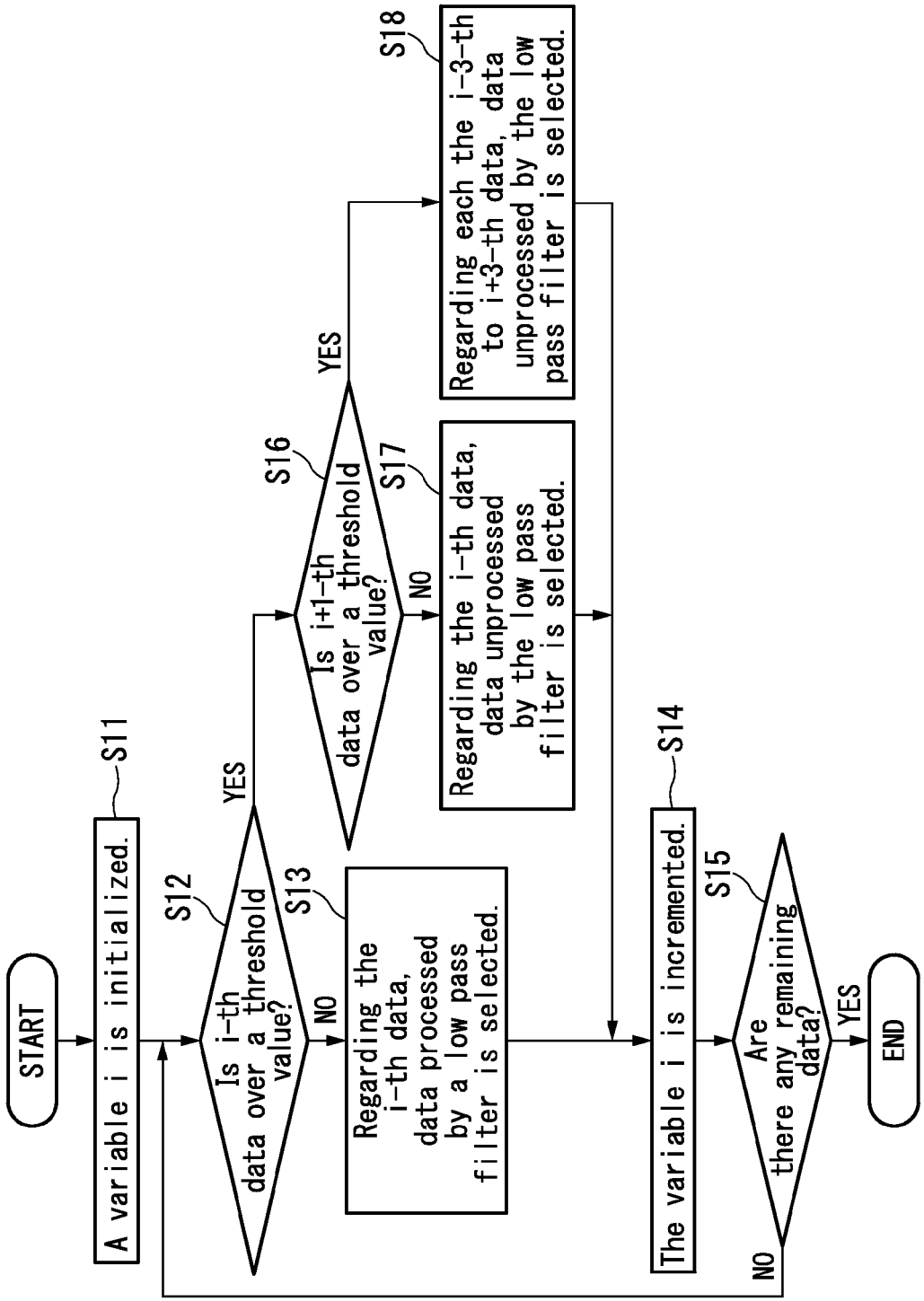
FIG. 5 is a flow chart illustrating details of a process in a synthesizing circuit of the filter included in the optical fiber temperature distribution measurement device in accordance with the first embodiment of the present invention.

The synthesizing circuit 35 is configured to select and synthesize one of the data Q1 processed by the low pass filter 32 and the data Q2 unprocessed by the low pass filter 32 in accordance with the determination results J from the determination circuit 34, and to output the synthesized data as the sample data D21. FIG. 5 is a flow chart illustrating details of a process in the synthesizing circuit of the filter included in the optical fiber temperature distribution measurement device in accordance with the first embodiment of the present invention. The flow chart illustrated in FIG. 5 is started every time the filtering process is started at each of the several sections set in the optical fiber FB.

When the process is started, first, a variable i is initialized (the variable i is set to "1") (step S11). The variable i separates 100 data sequentially read out by the filter 19a one by one. After the variable i is initialized, whether a determination result J(i) with regard to the i-th data indicates that the i-th data is over the threshold value set by the threshold value setting circuit 31 (J(i)=1) is determined (step S12).

If J(i) is equal to 0, a determination result of the step S12 is "NO". Regarding the i-th data, the data Q1 processed by the low pass filter 32 is selected and synthesized as the i-th data of the sample data D21 (step S13). After the processes described above are finished, the variable i is incremented (step S14), and whether the remaining data exist is determined (step S15). If all of the sample data at 100 sampling points included in the first section described above have not yet been read out, a determination result of the step S15 is "NO". Then, the process returns to the step S12.

On the other hand, if J(i) is equal to 1, a determination result of the step S12 is "YES". Whether a determination result J(i+1) with regard to the i+1-th data indicates that the i+1-th data is over the threshold value set by the threshold value setting circuit 31 (J(i+1)=1) is determined (step S16). If J(i+1) is equal to 0, a determination result of the step S16 is "NO". Regarding the i-th data, the data Q2 unprocessed by the low pass filter 32 is selected and synthesized as the i-th data of the sample data D21 (step S17).

On the other hand, if J(i+1) is equal to 1, a determination result of the step S16 is "YES". Regarding i−3-th to i+3-th data, the data Q2 unprocessed by the low pass filter 32 is selected and synthesized as the i−3-th to i+3-th data of the sample data D21 regardless of the determination results of the judging circuit 34 (step S18). After the processes of the step S17 and the step S18 described above are finished, the variable i is incremented (step S14), and whether the remaining data exist is determined (step S15).

If all of the sample data at 100 sampling points included in the first section have not yet been read out, a determination result of the step S15 is "NO". Then, the process returns to the step S12. On the other hand, if all of the sample data at 100 sampling points included in the first section have been read out, the determination result of the step S15 is "YES". A series of the processes illustrated in FIG. 5 are finished.

After the processes described above are finished, the sample data at 101 sampling points (including the sampling points at both ends of the section) included in the second section (the second closest section to the optical fiber temperature distribution measurement device 1) among the several sections set in the optical fiber FB are read out by each of the filters 19a and 19b, and the threshold values are set. The sample data of 100 sampling points included in the second section are sequentially read out one by one by the filters 19a and 19b, and the noises included in these sample data are eliminated. Then, regarding the several sections set in the optical fiber FR, the setting process of the threshold value TH1 and the elimination process of the noises are similarly performed.

After the processes in the filters 19a and 19b are finished, the operation unit 20 calculates the intensity ratio at each of the sampling points (the measuring points) using the sample data D21 from the filter 19a and the sample data D22 from the filter 19b. Thereby, the temperature at each of the sampling points is obtained. The temperature at each of the sampling points is input into the temperature corrector 21, and then, is corrected in accordance with the measurement results of the temperature sensor (the sensor configured to measure the temperature of the optical fiber FB), wherein the temperature sensor is not illustrated in the drawings. Thereby, the temperature distribution along the longitudinal direction of the optical fiber FB is obtained.

As described above, in the first embodiment, the filters 19a and 19b are configured to set the threshold value in accordance with the change of the amount of noises overlapped with the sample data (the sample data with regard to the Stokes light ST and the anti-Stokes light AS) averaged by the averaging circuit 18, and to select and synthesize one of the sample data processed by the low pass filter 32 and the sample data unprocessed by the low pass filter 32 depending on whether the sample data is over the threshold value. Thus, the noise component having a high spatial frequency can be effectively reduced without degrading the waveform of the sample data with regard to the Stokes light ST and the anti-Stokes light AS, and the temperature resolution can be improved.

(Second Embodiment)

Figure 6:
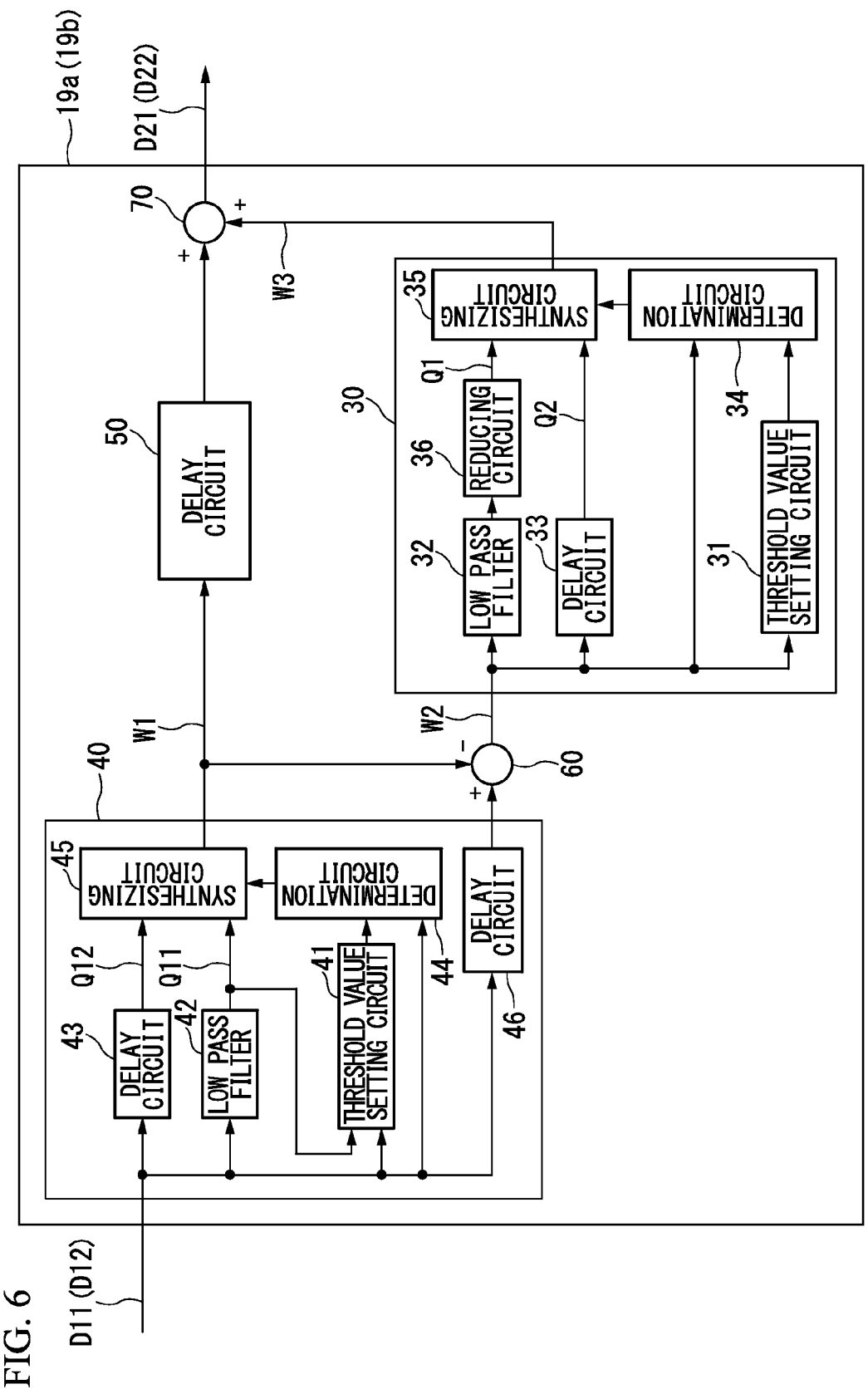
FIG. 6 is a block diagram illustrating internal components of a filter included in an optical fiber temperature distribution measurement device in accordance with a second embodiment of the present invention.

FIG. 6 is a block diagram illustrating internal components of a filter included in an optical fiber temperature distribution measurement device in accordance with a second embodiment of the present invention. The optical fiber temperature distribution measurement device in accordance with the second embodiment and the optical fiber temperature distribution measurement device 1 in accordance with the first embodiment are different in only the internal components of the filters 19a and 19b, in other words, and are similar to each other except the configuration of the filters 19a and 19b. Therefore, hereinafter, the filters 19a and 19b will be mainly described.

As illustrated in FIG. 6, the filters 19a and 19b included in the optical fiber temperature distribution measurement device in accordance with the second embodiment include, in addition to the filter device 30 described in the first embodiment, a spare filter device 40, a delay circuit 50, an operation circuit 60 (a first operation circuit), and an operation circuit 70 (a second operation circuit). The filters 19a and 19b having such a configuration are configured to perform the filtering process by the filter device 30 described above after large temperature variations are eliminated from the sample data D11 and D12. Thereby, even if the temperature distribution along the longitudinal direction of the optical fiber FB is not almost constant, noise components having a high spatial frequency are effectively eliminated.

In other words, in the first embodiment described above, given the temperature distribution along the longitudinal direction of the optical fiber FB is almost constant (the temperature does not greatly vary), each of the filters 19a and 19b is configured to calculate the threshold value used in the filter device 30. Thus, if the temperature distribution along the longitudinal direction of the optical fiber FB is not almost constant, there is a possibility that the threshold value is not calculated correctly and noise components having a high spatial frequency are not eliminated effectively.

Each of the filters 19a and 19b in the second embodiment is configured to perform the filtering process of the filter device 30 described above after large temperature variations are previously eliminated from the sample data D11 and D12. Thereby, even if the temperature distribution along the longitudinal direction of the optical fiber FB is not almost constant, the noise components having a high spatial frequency can be eliminated effectively. Hereinafter, in order to avoid redundant descriptions, only the filter 19a will be described in detail, meanwhile descriptions with regard to the filter 19b are omitted here.

The spare filter device 40 has a similar configuration as that of the filter device 30 described in the first embodiment, and is configured to filter the sample data D11 output from the averaging circuit 18 and to extract an outline of the sample data D11 (outline of the measured signal). Specifically, the spare filter device 40 includes a threshold value setting circuit 41 (a spare threshold value setting circuit), a low pass filter 42 (a spare filter), a delay circuit 43, a determination circuit 44 (a spare determination circuit), a synthesizing circuit 45 (a spare synthesizing circuit), and a delay circuit 46.

Figure 7A:
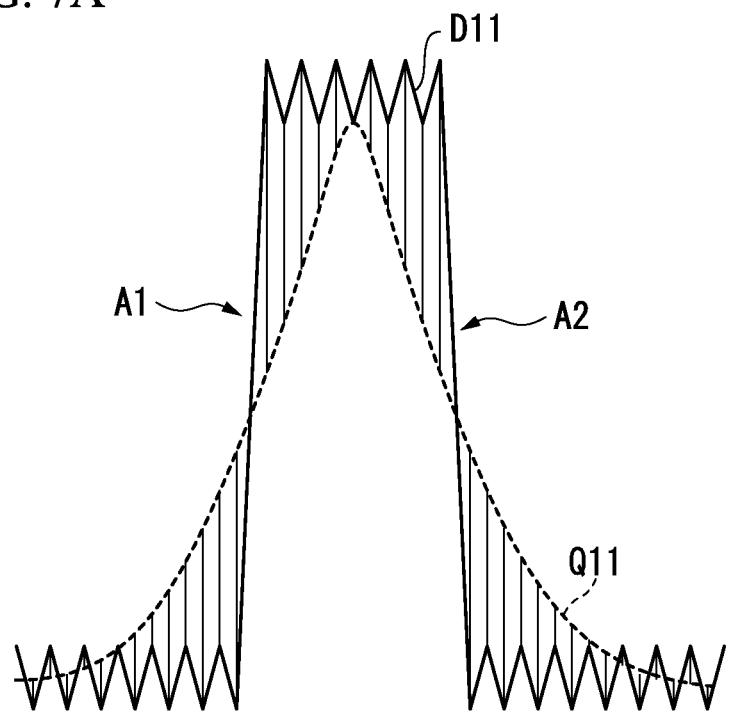
FIG. 7A is a diagram illustrating a threshold value set in a spare filter device of a filter included in the optical fiber temperature distribution measurement device in accordance with the second embodiment of the present invention.
Figure 7B:
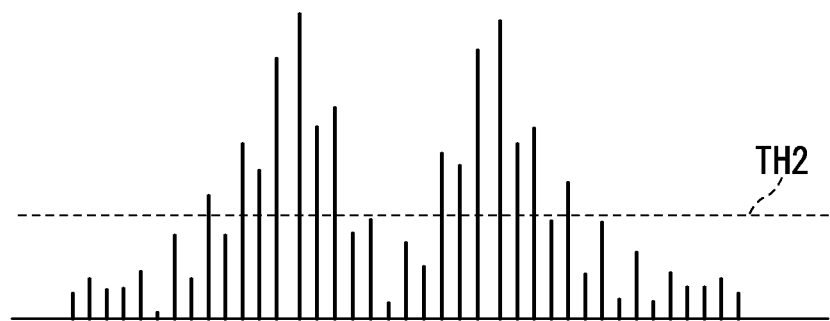
FIG. 7B is a diagram illustrating the threshold value set in the spare filter device of the filter included in the optical fiber temperature distribution measurement device in accordance with the second embodiment of the present invention.

The threshold value setting circuit 41 is configured to set a threshold value TH2 (a spare threshold value) used in the filtering process performed by the spare filter device 40. Specifically, the threshold value setting circuit 41 is configured to set the threshold value TH2 in accordance with an average of absolute values of the differences between sample data (data Q11) processed by the low pass filter 42 and sample data (sample data D11) unprocessed by the low pass filter 42. FIGS. 7A and 7B are diagrams illustrating the threshold value set in the spare filter device of the filter included in the optical fiber temperature distribution measurement device in accordance with the second embodiment of the present invention.

In the sample data D11 exemplified in FIG. 7A, the level of the data increases rapidly at a part indicated by a reference number A1, the level of the data decreases rapidly at a part indicated by a reference number A2, and the level of the data finely fluctuates throughout the data. As illustrated in FIG. 7A, in the data (the data Q11 input into the synthesizing circuit 45) obtained by processing such a sample data D11 by the low pass filter 42, the signal level gradually varies at the parts indicated by the reference numbers A1 and A2, and the fine level fluctuation is eliminated from the data.

The threshold value setting circuit 41 is configured to calculate firstly the absolute values of the differences between the sample data (the data Q11 illustrated in FIG. 7A) processed by the low pass filter 42 and the sample data (the sample data D11 illustrated in FIG. 7A) unprocessed by the low pass filter 42 at every sampling point. As illustrated in FIG. 7B, the threshold value setting circuit 41 is configured to calculate the average of the absolute values of the differences obtained at every sampling point and to set a value almost twice the calculated average as the threshold value TH2.

In a similar way to the threshold value setting circuit 31 provided in the filter device 30, the threshold value setting circuit 41 is configured to set several sections of the optical fiber FB and to set the threshold values TH2 for the sections, respectively. For example, the threshold value setting circuit 41 is configured to set several sections of the optical fiber FB. Each of the sections has a length of 1 kilometer. If the sampling points are set at intervals of 1 meter along the longitudinal direction of the optical fiber FB, each of the sections having the length of 1 kilometer includes 1000 sampling points. Thus, regarding each of the sections, the threshold value setting circuit 41 is configured to calculate the threshold value TH2 using successive 1000 data obtained at 1000 sampling points. Hereinafter, in order to distinguish between the sections set by the threshold value setting circuit 31 and the sections set by the threshold value setting circuit 41, the sections set by the threshold value setting circuit 31 are referred to as "small sections", while the sections set by the threshold value setting circuit 41 are referred to as "large sections".

The low pass filter 42 is configured to eliminate a frequency component of the sample data D11 which is larger than a predetermined Cutoff frequency (a second frequency). The low pass filter 42 is provided to extract the outline of the sample data D11 (the outline of the measured signal). The Cutoff frequency of the low pass filter 42 is appropriately set in accordance with the outline of the sample data D11 to be extracted.

The delay circuit 43 is configured to delay the input sample data D11 by a predetermined time. Specifically, the delay circuit 43 is configured to delay the sample data D11 by the time needed to perform the process in the low pass filter 42. The delay circuit 43 is provided to adjust the timing to input the data Q11 processed by the low pass filter 42 into the synthesizing circuit 45 and the timing to input the data Q12 (the sample data D11) unprocessed by the low pass filter 42 into the synthesizing circuit 45. If such a timing adjustment is unnecessary, the delay circuit 43 may be omitted.

The determination circuit 44 is configured to determine if each of the sample data D11 is over the threshold value TH2 set by the threshold value setting circuit 41, and to input determination results into the synthesizing circuit 45. In accordance with the determination results from the determination circuit 44, the synthesizing circuit 45 is configured to select one of the data Q11 processed by the low pass filter 42 and the data Q12 unprocessed by the low pass filter 42, and synthesize the selected data. Specifically, if the determination result from the determination circuit 44 indicates that the sample data D11 is not over the threshold value TH2, the synthesizing circuit 45 selects the data Q11 processed by the low pass filter 42 and synthesizes the data Q11. On the other hand, if the determination result from the determination circuit 44 indicates that the sample data D11 is over the threshold value TH2, the synthesizing circuit 45 selects the data Q12 unprocessed by the low pass filter 42 and synthesizes the data Q12.

In a similar way to the delay circuit 43, the delay circuit 46 is configured to delay the input sample data D11 by a predetermined time. The delay circuit 46 delays the sample data D11 by the time needed to perform the process by the low pass filter 42 and the process by the synthesizing circuit 45. The delay circuit 46 is provided to adjust the timing to input sample data W1 synthesized by the synthesizing circuit 45 into the operation circuit 60 and the timing to input the sample data D11 into the operation circuit 60.

The delay circuit 50 is configured to delay the sample data W1 output from the synthesizing circuit 45 of the spare filter device 40 by a predetermined time. Specifically, the delay circuit 50 is configured to delay the sample data W1 by the time needed to perform the process in the filter device 30. The operation circuit 60 is configured to input sample data W2 into the filter device 30. The sample data W2 are obtained by subtracting the sample data W1 (the sample data output from the synthesizing circuit 45 of the spare filter device 40) from the sample data D11 output from the delay circuit 46 of the spare filter device 40. In other words, the operation circuit 60 is configured to input the sample data W2 into the filter device 30, wherein the sample data W2 are obtained by eliminating the outline of the sample data D11 (the large temperature variations) from the sample data D11.

The operation circuit 70 is configured to add the sample data output from the delay circuit 50 (the sample data W1) and the sample data W3 output from the filter device 30 and to output resulted data as sample data D21. The filter device 30 is essentially the same as that described in the first embodiment. In the second embodiment, a reducing circuit 36 is provided between the low pass filter 32 and the synthesizing circuit 35 to reduce the level of the data Q1 output from the low pass filter 32. The reducing circuit 36 is provided to reduce effectively the noise components having a high spatial frequency. For example, the reducing circuit 36 reduces the level of the data Q1 to a range of approximately 0.3 to approximately 0.5 times.

Figure 8A:
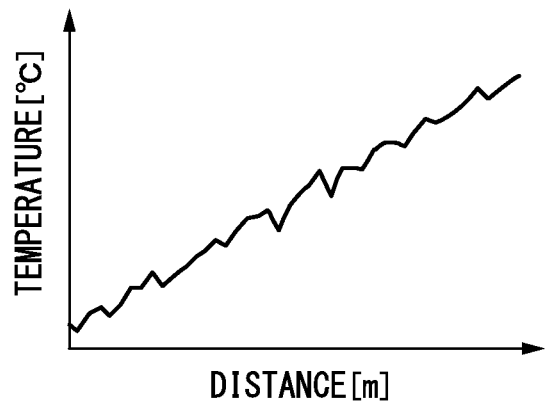
FIG. 8A is a diagram illustrating effects of a reducing circuit included in the optical fiber temperature distribution measurement device in accordance with the second embodiment of the present invention.
Figure 8B:
FIG. 8B is a diagram illustrating the effects of the reducing circuit included in the optical fiber temperature distribution measurement device in accordance with the second embodiment of the present invention.
Figure 8C:
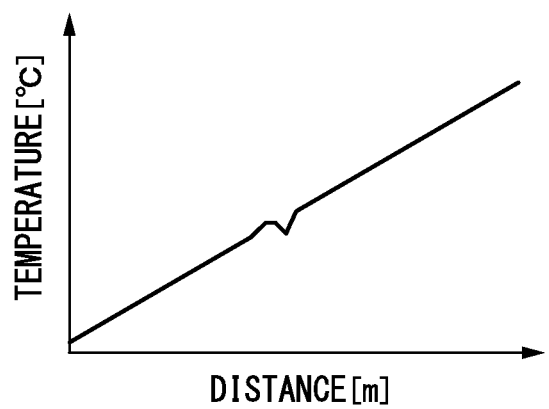
FIG. 8C is a diagram illustrating the effects of the reducing circuit included in the optical fiber temperature distribution measurement device in accordance with the second embodiment of the present invention.

FIGS. 8A to 8C are diagrams illustrating the effects of the reducing circuit included in the optical fiber temperature distribution measurement device in accordance with the second embodiment of the present invention. Hereinafter, an example wherein the temperature along the longitudinal direction of the optical fiber FB gradually increases will be described. If the reducing circuit 36 is omitted, as illustrated in FIG. 8A, the temperature distribution measured by the optical fiber temperature distribution measurement device gradually increases with distance and has fine temperature variations.

On the other hand, the temperature distributions as illustrated in FIGS. 8B and 8C are obtained by providing the reducing circuit 36. The temperature distribution illustrated in FIG. 8B is obtained by setting the reducing ratio of the reducing circuit 36 to "0.375", while the temperature distribution illustrated in FIG. 8C is obtained by setting the reducing ratio of the reducing circuit 36 to "0.05". FIG. 8B indicates that the temperature distribution has fine temperature variations, but is a normal distribution. If the actual fine temperature variations are smoothed by the filter, the temperature error can be reduced. On the other hand, FIG. 8C indicates that the temperature distribution has linear sections except a section of a large temperature variation, and is not a normal distribution. Thus, the reducing ratio of the reducing circuit 36 may be set to the range of approximately 0.3 to approximately 0.5 as described above.

A determination result from the determination circuit 44 for i-th data X(i) among the sample data D11 is defined as J1(i), a determination result from the determination circuit 34 for i-th data W(i) among the sample data W1 is defined as J2(i), a data (the sample data D21) synthesized in accordance with the determination results J1(i) and J2(i) is define as Y(i). A transfer function of the low pass filter 42 is defined as H1(z), a transfer function of the low pass filter 32 is defined as H2(z), and the reducing ratio of the reducing circuit 36 is defined as "a". The filter 19a illustrated in FIG. 6 is represented by a following equation (3).

$$Y(i)=W1(i)+W3(i)$$

$$W1(i)=X(i)J1(i)+H1(z)X(i)(1-J1(i))$$

$$W2(i)=X(i)-W1(i)$$

$$W3(i)=W2(i)J2(i)+aH2(z)W2(i)(1-J2(i)) \quad (3)$$

If X(i) is over the threshold value TH2, the determination result J1(i) is equal to 1. On the other hand, if X(i) is not over the threshold value TH2, the determination result J1(i) is equal to 0. If W1(i) is over the threshold value TH1, the determination result J2(i) is equal to 1. On the other hand, if W1(i) is not over the threshold value TH1, the determination result J2(i) is equal to 0. Given a surrounding temperature is constant during a measuring of the temperature resolution, it is thought that J1(i) is equal to 0, and J2(i) is equal to 0. Thus, the equation (3) is transformed into a following equation (4).

$$\begin{aligned} Y(i) &= W1(i) + W3(i) \\ &= H1(z)X(i) + aH2(z)W2(i) \\ &= H1(z)X(i) + aH2(z)(1 - H1(z))X(i) \\ &= \{H1(z) + a(1 - H1(z))H2(z)\}X(i) \end{aligned} \quad (4)$$

In the equation (4), the first member of the right side indicates a signal component, and the second member of the right side indicates a noise component. For ease of explanation, given the low pass filter 32 provided in the filter device 30 is configured to pass almost signal components, the temperature resolution depends on the reducing ratio a in the equation (4). Thus, the temperature resolution can be improved and be approximately doubled or tripled by setting the reducing ratio a to the range of approximately 0.3 to approximately 0.5.

Next, operations of the optical fiber temperature distribution measurement device in accordance with the second embodiment will be described. Since the operations to sequentially output the pulses of laser from the light source 11 and to obtain the average value of the sample data with regard to the Stokes light ST (the sample data D11) and the average value of the sample data with regard to the anti-Stokes light AS (the sample data D12) using the averaging circuit 18 are similar to those of the first embodiment, a description of these operations are omitted here.

After the averaging process in the averaging circuit 18 is finished, the filters 19a and 19b performs a filtering process to eliminate the noises included in the averaged sample data. The filtering process is performed at every the large section set in the optical fiber FB. Specifically, first, the sample data at 1000 sampling points included in the first large section (the large section closest to the optical fiber temperature distribution measurement device 1) among the several large sections set in the optical fiber FB are read out by each of the spare filter devices 40 of the filters 19a and 19b to set the threshold value TH2.

In parallel with the processes described above, the sample data at 101 sampling points (including the sampling points at both ends of the small section) included in each of the several small sections set in the optical fiber FB are read out by each of the filter device 30 of the filters 19a and 19b to set the threshold value TH1 for each of the several small sections. For ease of explanation, the example that the threshold values TH1 are set at once for the several small sections in one large section is described. In a similar way to the first embodiment, the threshold values TH1 for the small sections may be set sequentially.

Next, the sample data at 1000 sampling points included in the first large section are sequentially read out one by one by the filters 19a and 19b, and the noises included in these sample data are eliminated. Specifically, the first 1000 sample data among the sample data D11 are sequentially read out one by one by the filter 19a, while the first 1000 sample data among the sample data D12 are sequentially read out one by one by the filter 19b. The noises included in these data are eliminated by the filters 19a and 19b. Since the process performed in the filters 19a and 19b are similar to each other, and hereinafter, only the process performed in the filter 19a will be described.

The data read out by the filter 19a are input into the low pass filter 42, the delay circuit 43, the determination circuit 44, and the delay circuit 46 of the spare filter device 40 provided in the filter 19a. The high frequency components are eliminated by the low pass filter 42, while the data are delayed by the delay circuit 43 by a predetermined time. The data Q11 and Q12 are output from the low pass filter 42 and the delay circuit 43, respectively, and then, and the data Q11 and Q12 are input into the synthesizing circuit 45. The determination circuit 44 determines if the input data are over the threshold value TH2 set by the threshold value setting circuit 41, and the determination results are input into the synthesizing circuit 45.

The synthesizing circuit 45 is configured to select and synthesize one of the data Q11 processed by the low pass filter 42 and the data Q12 unprocessed by the low pass filter 42 in accordance with the determination results from the determination circuit 44, and outputs the synthesized data as the sample data W1. The delay circuit 46 is configured to output the sample data D11 at the timing of the output of the sample data W1 (or, at an almost same timing as the timing of the output of the sample data W1).

The sample data W1 and the sample data D11 output from the spare filter device 40 are input into the operation circuit 60, and the sample data W2 are obtained by subtracting the sample data W1 from the sample data D11. The sample data W2 are input into the filter device 30, and the filter device 30 determines if the input data is over the threshold value TH1 set at every small section. The synthesizing circuit 35 is configured to select and synthesize one of the data Q1 processed by the low pass filter 32 and the data Q2 unprocessed by the low pass filter 32 in accordance with the determination results, and to output the synthesized data as the sample data W3. The operation circuit 70 is configured to add the sample data W3 output from the filter device 30 and the sample data W1 output from the spare filter device 40 and routed through the delay circuit 50, and to output the resulted data as the sample data D21.

After the processes for the first large sections described above are finished, the sample data at 1000 sampling points included in the second large section (the second closest large section to the optical fiber temperature distribution measurement device 1) among the several large sections set in the optical fiber FB are read out by each of the filters 19a and 19b, and processes, which are similar to the processes described above, are performed. Hereinafter, regarding each of the several small sections and each of the several large sections set in the optical fiber FB, the setting process of the threshold values TH1 and TH2 and the elimination process of the noises are similarly performed.

After the processes in the filters 19a and 19b are finished, the operation unit 20 calculates an intensity ratio at each of the sampling points (the measuring points) using the sample data D21 from the filter 19a and the sample data D22 from the filter 19b. Thereby, the temperature at each of the sampling points is obtained. The temperature at each of the sampling points is input into the temperature corrector 21, and then, the temperature is corrected in accordance with the measurement results of the temperature sensor (the temperature sensor configured to measure the temperature of the optical fiber FB). The temperature sensor is not illustrated in the drawings. Thereby, the temperature distribution along the longitudinal direction of the optical fiber FB is obtained.

Figure 9A:
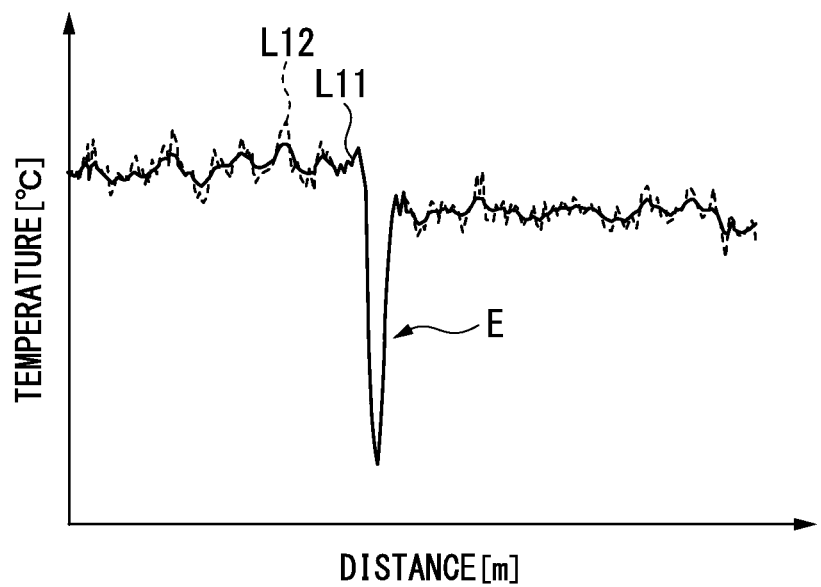
FIG. 9A is a diagram indicating an example of a measurement result of the optical fiber temperature distribution measurement device in accordance with the second embodiment of the present invention.
Figure 9B:
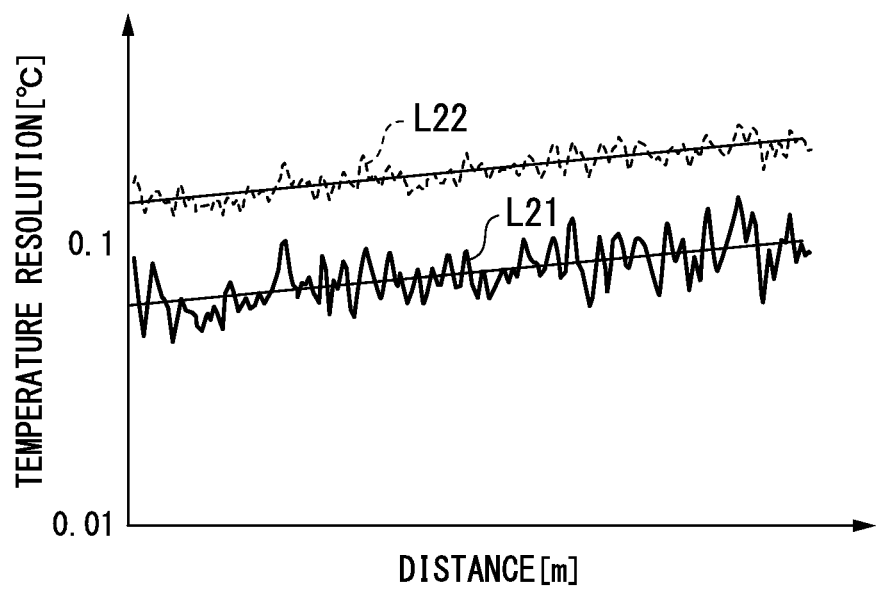
FIG. 9B is a diagram indicating the example of the measurement result of the optical fiber temperature distribution measurement device in accordance with the second embodiment of the present invention.

FIGS. 9A and 9B are diagrams indicating an example of a measurement result of the optical fiber temperature distribution measurement device in accordance with the second embodiment of the present invention. FIG. 9A is a diagram indicating a temperature distribution, while FIG. 9B is a diagram indicating a temperature resolution. In FIG. 9A, a curved line indicated by a reference number L11 indicates an example of a temperature distribution obtained by the optical fiber temperature distribution measurement device in accordance with the second embodiment, while a curved line indicated by a reference number L12 indicates an example of a temperature distribution obtained by an optical fiber temperature distribution measurement device in the related art without having the filters 19a and 19b. In FIG. 9B, a curved line indicated by a reference number L21 indicates an example of a temperature resolution of the optical fiber temperature distribution measurement device in accordance with the second embodiment, while a curved line indicated by a reference number L22 indicates an example of a temperature resolution of an optical fiber temperature distribution measurement device in the related art.

FIG. 9A shows that the curved line L11, which indicates the temperature distribution obtained by the optical fiber temperature distribution measurement device in accordance with the second embodiment, has a fine temperature variation, which is more gradual than those of the curved line L12, which indicates the temperature distribution obtained by the optical fiber temperature distribution measurement device in the related art. FIG. 9A shows that the noise components having a high spatial frequency are effectively reduced. The region that the temperature locally decreases (the section of an arrow indicated by a reference number E) shows that the temperature distribution obtained by the optical fiber temperature distribution measurement device in accordance with the second embodiment are similar to that obtained by the optical fiber temperature distribution measurement device in the related art, and that the waveform of the signal component is not degraded after the filtering processes of the filters 19a and 19b are performed.

FIG. 9B shows that the curved line L21, which indicates the temperature resolution of the optical fiber temperature distribution measurement device in accordance with the second embodiment, has overall smaller values than those of the curved line L22, which indicates the temperature resolution of the optical fiber temperature distribution measurement device in the related art. FIG. 9B shows that the temperature resolution of the optical fiber temperature distribution measurement device in accordance with the second embodiment improves. Specifically, in the example illustrated in FIG. 9B, the temperature resolution of the optical fiber temperature distribution measurement device in accordance with the second embodiment is improved and is approximately 2.3 times of the temperature resolution of the optical fiber temperature distribution measurement device in the related art.

As described above, in the second embodiment, the filters 19a and 19b including the spare filter device 40 configured to extract the outlines of the sample data D11 and D12 (the large temperature variation) are used, wherein the spare filter device 40 is disposed in front of the filter device 30. Thereby, the filtering process by the filter device 30 is performed after the large temperature variation is eliminated from the sample data D11 and D12. Thus, if the temperature distribution along the longitudinal direction of the optical fiber FB is not almost constant, the noise components having a high spatial frequency are effectively reduced without degrading the waveform of the signal component. Thus, the temperature resolution can be improved.

(Third Embodiment)

Figure 10:
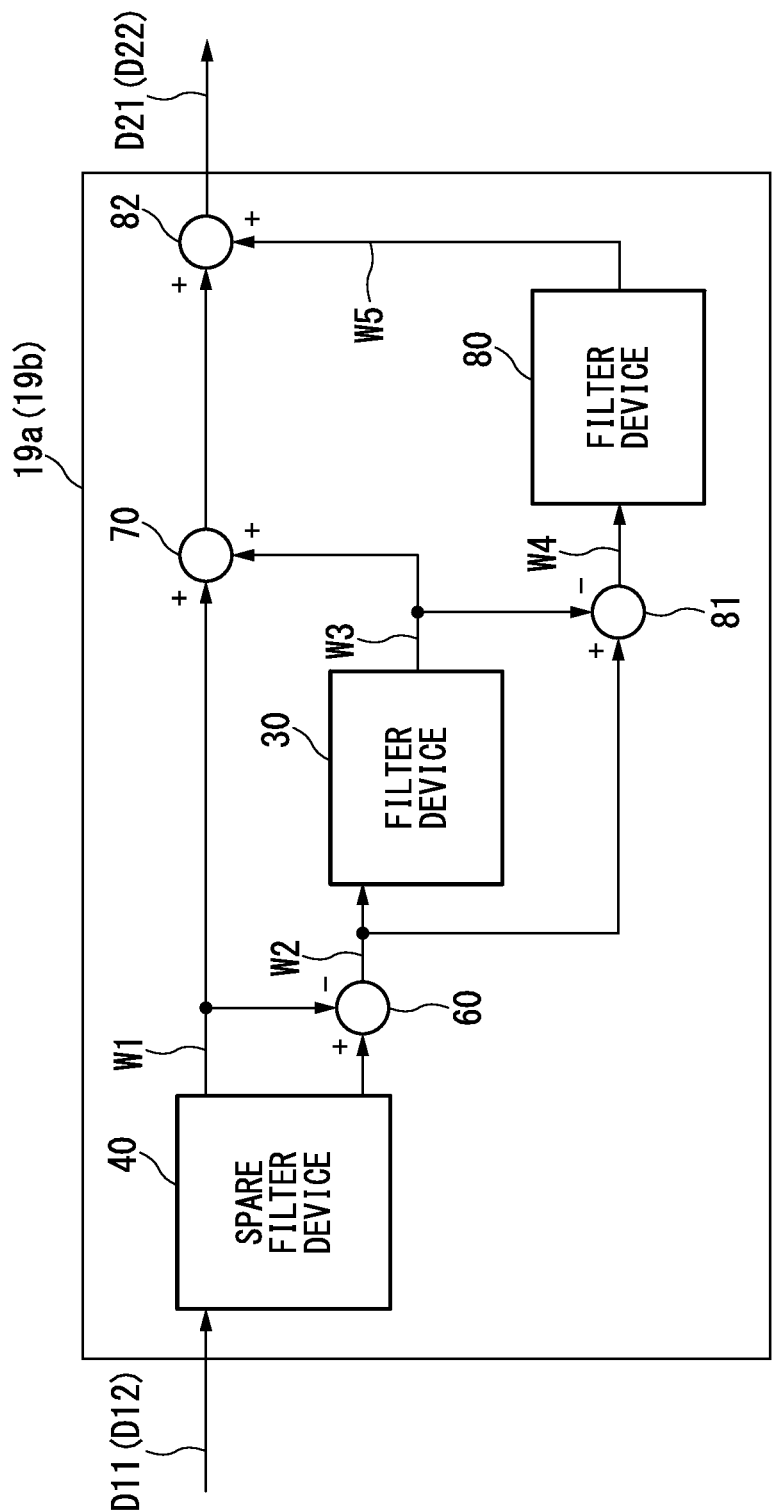
FIG. 10 is a block diagram illustrating internal components of a filter included in an optical fiber temperature distribution measurement device in accordance with a third embodiment of the present invention.

FIG. 10 is a block diagram illustrating internal components of a filter included in an optical fiber temperature distribution measurement device in accordance with a third embodiment of the present invention. Each of the filters 19a and 19b of the optical fiber temperature distribution measurement device in accordance with the second embodiment includes a two-stage configuration which includes the spare filter device 40 and the filter device 30. On the other hand, each of filters 19a and 19b of the optical fiber temperature distribution measurement device in accordance with the third embodiment includes a three-stage configuration which includes the spare filter device 40, the filter device 30, and a filter device 80.

Specifically, each of the filters 19a and 19b of the optical fiber temperature distribution measurement device in accordance with the third embodiment includes a configuration that the filter device 80 and operation circuits 81 and 82 are incorporated into each of the filters 19a and 19b of the optical fiber temperature distribution measurement device in accordance with the second embodiment. The delay circuit 50 is not illustrated in FIG. 10. The filter device 80 is similar to the filter device 30. The operation circuit 81 is configured to input sample data W4 into the filter device 80. The sample data W4 is obtained by subtracting the sample data W3 (the sample data output from the synthesizing circuit 35 of the filter device 30) from the sample data W2 output from the operation circuit 60. A threshold setting circuit provided in the filter device 80 is configured to set a threshold value in accordance with the change in the amount of noise overlapped with the sample data W4. A low pass filter provided in the filter device 80 is configured to eliminate a frequency component of the sample data W4 which is larger than a predetermined Cutoff frequency. A delay circuit provided in the filter device 80 is configured to delay the sample data W4 by a predetermined time. Specifically, the delay circuit is configured to delay the sample data W4 by the time needed to perform the process in the low pass filter. A determination circuit provided in the filter device 80 is configured to determine if each of the sample data W4 is over the threshold value, and to input determination results into a synthesizing circuit provided in the filter device 80. In accordance with the determination results from the determination circuit, the synthesizing circuit is configured to select one of data processed by the low pass filter and data unprocessed by the low pass filter, and synthesize the selected data. A reducing circuit 36 is provided between the low pass filter and the synthesizing circuit in order to reduce effectively noise components having a high spatial frequency. The operation circuit 82 is configured to add the sample data output from the operation circuit 70 and the sample data W5 output from the filter device 80, and to output the resulted data as the sample data D21.

As described above, the optical fiber temperature distribution measurement device in accordance with the third embodiment includes the filters 19a and 19b, wherein each of the filters 19a and 19b includes the three-stage configuration which includes the spare filter device 40, the filter device 30, and the filter device 80. Thus, the temperature resolution of the optical fiber temperature distribution measurement device in accordance with the third embodiment is greater improved than that of the optical fiber temperature distribution measurement device in accordance with the second embodiment.

(Fourth Embodiment)

Figure 11:
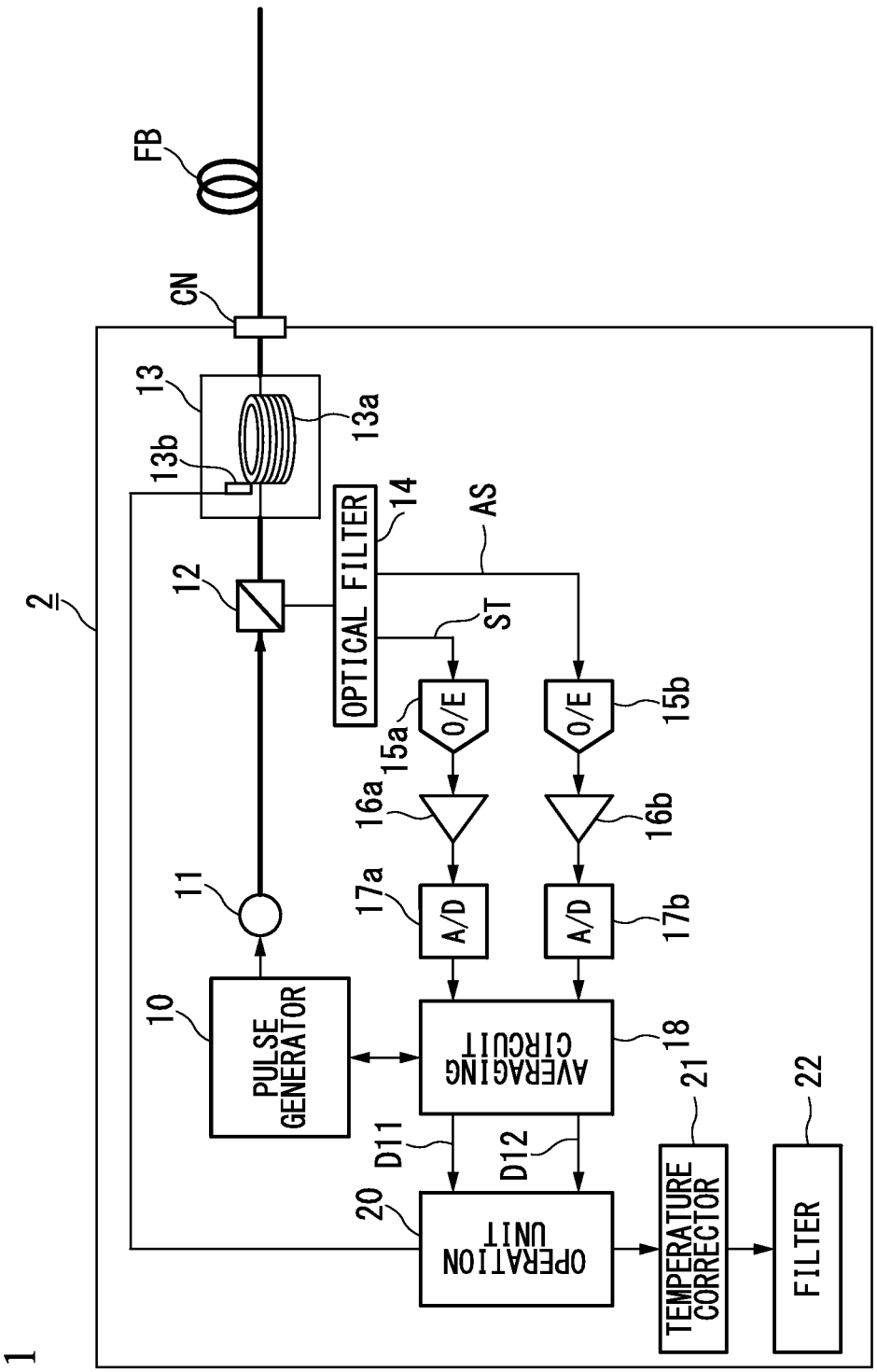
FIG. 11 is a block diagram illustrating main components of an optical fiber temperature distribution measurement device in accordance with a fourth embodiment of the present invention.

FIG. 11 is a block diagram illustrating main components of an optical fiber temperature distribution measurement device in accordance with a fourth embodiment of the present invention. An optical fiber temperature distribution measurement device 2 in accordance with the fourth embodiment has a filter 22 configured to correct a temperature distribution obtained by the temperature corrector 21 in place of the filters 19a and 19b of the optical fiber temperature distribution measurement device in accordance with the first to third embodiments. The filter 22 has the same configuration as those of the filters 19a and 19b.

The optical fiber temperature distribution measurement device in accordance with the first to third embodiments is configured to filter the intensity distribution of the Stokes light ST and the anti-Stokes light AS along the longitudinal direction of the optical fiber FB (the sample data D11 and D12) using the filters 19a and 19b. On the other hand, the optical fiber temperature distribution measurement device in accordance with the fourth embodiment is configured to filter the temperature distribution along the longitudinal direction of the optical fiber FB (correctly, the temperature distribution in which the temperature is corrected by a temperature corrector 21) using the filter 22.

The temperature distribution along the longitudinal direction of the optical fiber FB is obtained using the intensity distribution of the Stokes light ST and the anti-Stokes light AS along the longitudinal direction of the optical fiber FB. Thus, in a similar way to the first to third embodiments, in the fourth embodiment, noise components having a high spatial frequency can be effectively reduced without degrading a waveform, and the temperature resolution can be improved.

Specifically, the filter 22 is configured to filter the temperature distribution along the longitudinal direction of the optical fiber FB (the temperature distribution in which the temperature is corrected by the temperature corrector 21), and to eliminate noises included in the data, which indicate the temperature distribution. As is the case in the filters 19a and 19b illustrated in FIG. 2, the filter 22 includes a filter device, wherein the filter device includes a threshold setting circuit, a low pass filter, a delay circuit, a determination circuit, and a synthesizing circuit.

The threshold setting circuit is configured to set a threshold value TH3 used for the filtering performed by the filter device. Specifically, the threshold setting circuit is configured to set the threshold value TH3 in accordance with the change in the amount of noise overlapped with the data, which are output from the temperature corrector 21 and indicate the temperature distribution. Given i-th data among the data indicating the temperature distribution is represented by X(i), the threshold setting circuit is configured to calculate the threshold value TH3 to be set in accordance with a following equation (5) using successive (N+1) data. In the following equation (5), α is arbitrary constant (for example, "2").

$$TH3 = \alpha \times \frac{1}{N} \sum_i |X(i+1) - X(i)| \quad (5)$$

The threshold value setting circuit is configured to obtain the threshold value TH3 by multiplying the average of the absolute values of the differences between neighboring data (the number of the differences is N) by the constant α. Namely, the threshold value setting circuit is configured to calculate the threshold value TH3 using the difference between neighboring data. The threshold value setting circuit is configured to set several sections of the optical fiber FB, and to set the threshold values TH3 for the sections, respectively. The method of setting the sections is similar to that of the threshold value setting circuit 31 in accordance with the first embodiment The low pass filter is configured to eliminate a frequency component, which is larger than a predetermined Cutoff frequency (a first frequency), of the data indicating the temperature distribution. The low pass filter is provided to eliminate noise components having a high spatial frequency along the longitudinal direction of the optical fiber FB. The Cutoff frequency of the low pass filter is appropriately set in accordance with the needed temperature resolution.

The delay circuit is configured to delay the data indicating the temperature distribution by a predetermined time. Specifically, the delay circuit is configured to delay the data indicating the temperature distribution by the time needed to perform the process in the low pass filter. The delay circuit is provided to adjust the timing to input data processed by the low pass filter into the synthesizing circuit and the timing to input data (the data output from the temperature corrector 21 and indicating the temperature distribution) unprocessed by the low pass filter into the synthesizing circuit.

The determination circuit is configured to determine if each of the data indicating the temperature distribution is over the threshold value TH3 set by the threshold value setting circuit, and to input determination results into the synthesizing circuit. In accordance with the determination results from the determination circuit, the synthesizing circuit is configured to select one of the data processed by the low pass filter and the data unprocessed by the low pass filter, and synthesize the selected data. Specifically, if the determination result from the determination circuit indicates that the data is not over the threshold value TH3, the synthesizing circuit selects the data processed by the low pass filter and synthesizes the selected data. On the other hand, if the determination result from the determination circuit indicates that the data is over the threshold value TH3, the synthesizing circuit selects the data unprocessed by the low pass filter and synthesizes the selected data. Since the noise component having a high spatial frequency can be effectively reduced, the temperature resolution can be improved.

Hereinbefore, the optical fiber temperature distribution measurement devices in accordance with the embodiments of the present invention are described, but the present invention is not limited to these embodiments, and various modifications are included in the present invention without departure from the spirit of the present invention.

What is claimed is:

1. An optical fiber temperature distribution measurement device configured to receive Raman back scattering lights obtained by inputting a pulsed light into an optical fiber and to measure a temperature distribution along a longitudinal direction of the optical fiber, the optical fiber temperature distribution measurement device comprising:
   a first filter device, the first filter device comprising:
      a threshold value setting circuit configured to set a threshold value in accordance with a change in an amount of noise overlapped with a first measured signal, the first measured signal indicating one of an intensity distribution and a temperature distribution of the Raman back scattering lights along the longitudinal direction of the optical fiber;
      a filter configured to eliminate frequency components of the first measured signal to generate a second measured signal, the frequency components being larger than a predetermined first frequency;
      a determination circuit configured to determine if the first measured signal is over the threshold value; and
      a synthesizing circuit configured
         to select the second measured signal if the determination result from the determination circuit indicates that the first measured signal is not over the threshold value,
         to select the first measured signal if the determination result from the determination circuit indicates that the first measured signal is over the threshold value, and
         to select the first measured signal for a predetermined term regardless of the determination results from the determination circuit if the determination results from the determination circuit which indicate that the first measured signal is over the threshold value are successively obtained; and an operation unit configured to calculate the temperature distribution along the longitudinal direction of the optical fiber using the first or second measured signal selected by the synthesizing circuit.

2. The optical fiber temperature distribution measurement device according to claim 1, wherein the threshold value setting circuit is configured to set several sections of the optical fiber, and to set threshold values for the sections, respectively.

3. The optical fiber temperature distribution measurement device according to claim 1, wherein the first filter device further comprises a first delay circuit configured to delay the first measured signal by a time needed to perform a process in the filter, and wherein if the determination result from the determination circuit indicates that the measured signal is over the threshold value, the synthesizing circuit selects the delayed first measured signal output from the first delay circuit.

4. The optical fiber temperature distribution measurement device according to claim 1, wherein the threshold value setting circuit is configured to calculate an average of absolute values of differences between neighboring measured signals, and to set a value obtained by multiplying the average by a predetermined constant as the threshold value, and the neighboring measured signals indicate the intensity distribution or the temperature distribution of the Raman back scattering lights generated at neighboring sampling points among sampling points set along the longitudinal direction of the optical fiber.

5. The optical fiber temperature distribution measurement device according to claim 1, wherein the first filter device further comprises a reducing circuit configured to reduce a level of the second measured signal and to input the reduced second measured signal to the synthesizing circuit.

6. The optical fiber temperature distribution measurement device according to claim 1, further comprising:

a spare filter device configured to extract an outline of the first measured signal;

a first operation circuit configured to subtract a processing result of the spare filter device from the first measured signal and to input the subtracted signal to the first filter device as the first measured signal; and a second operation circuit configured to add the processing result of the spare filter device and a processing result of the first filter device.

7. The optical fiber temperature distribution measurement device according to claim 6, wherein the spare filter device comprises:

a spare filter configured to eliminate a spare frequency component of the first measured signal to generate a third measured signal, the spare frequency component being larger than a predetermined second frequency;

a spare threshold value setting circuit configured to set a spare threshold value in accordance with an average of absolute values of differences between the third measured signal and the first measured signal;

a spare determination circuit configured to determine if the first measured signal is over the spare threshold value; and a spare synthesizing circuit configured to select one of the third measured signal and the first measured signal in accordance with a spare determination result from the spare determination circuit.

8. The optical fiber temperature distribution measurement device according to claim 7, wherein if the spare determination result from the spare determination circuit indicates that the first measured signal is not over the spare threshold value, the spare synthesizing circuit selects the third measured signal, and if the spare determination result from the spare determination circuit indicates that the first measured signal is over the spare threshold value, the spare synthesizing circuit selects the first measured signal.

9. The optical fiber temperature distribution measurement device according to claim 8, wherein the spare filter device further comprises a first spare delay circuit configured to delay the first measured signal by a time needed to perform a process in the spare filter, and wherein if the spare determination result from the spare determination circuit indicates that the first measured signal is over the spare threshold value, the spare synthesizing circuit selects the delayed first measured signal output from the first spare delay circuit.

10. The optical fiber temperature distribution measurement device according to claim 9, wherein the spare filter device further comprises a second spare delay circuit configured to delay the first measured signal by a time, which is obtained by adding the time needed to perform the process in the spare filter and a time needed to perform a process in the spare synthesizing circuit.

11. The optical fiber temperature distribution measurement device according to claim 6, further comprising a second delay circuit configured to delay a processing result of the spare filter device by a time needed to perform a process in the first filter device.

12. The optical fiber temperature distribution measurement device according to claim 11, wherein the second delay circuit is in connection with the second operation circuit, and wherein the second operation circuit is configured to add a processing result delayed by the second delay circuit and the processing result of the first filter device.

13. The optical fiber temperature distribution measurement device according to claim 6, further comprising:

a second filter device having the same configuration as that of the first filter device;

a third operation circuit configured to subtract the processing result of the first filter device from the first measured signal output from the first operation circuit and to input the subtracted signal to the second filter device as a fourth measured signal; and a fourth operation circuit configured to add a processing result of the second filter device and a processing result of the second operation circuit.

14. A method of measuring an optical fiber temperature distribution, comprising:

a first threshold value setting step setting a first threshold value in accordance with a change of an amount of noise overlapped with a first measured signal, the first measured signal indicating one of an intensity distribution and a temperature distribution of Raman back scattering lights along a longitudinal direction of an optical fiber, the Raman back scattering lights obtained by inputting a pulsed light into the optical fiber;

a first eliminating step eliminating frequency components included in a part of the first measured signal to generate a second measured signal, the frequency components being larger than a predetermined first frequency;

a first determining step determining if the first measured signal is over the first threshold value;

a first selecting step
- selecting the second measured signal if the determination result from the first determining step indicates that the first measured signal is not over the first threshold value,
- selecting the first measured signal if the determination result from the first determining step indicates that the first measured signal is over the first threshold value, and
- selecting the first measured signal for a predetermined term regardless of the determination results from the first determining step if the determination results from the first determining step which indicate that the first measured signal is over the threshold value are successively obtained; and a measuring step measuring a temperature distribution along a longitudinal direction of the optical fiber using data selected in the first selecting step.

15. The method of measuring the optical fiber temperature distribution according to claim 14, wherein the first threshold value setting step includes separating the optical fiber into several sections, and setting the threshold value at each of the sections.

16. The method of measuring the optical fiber temperature distribution according to claim 14, further comprising, before the first threshold value setting step;

a first outline extracting step extracting an outline of the first measured signal; and a first subtracting step subtracting a processing result of the first outline extracting step from the first measured signal; and further comprising, after the first selecting step, a first adding step adding the processing result of the first outline extracting step and a processing result of the first selecting step.

17. The method of measuring the optical fiber temperature distribution according to claim 16, further comprising, after the first selecting step;

a second subtracting step subtracting the processing result of the first selecting step from a processing result of the first subtracting step;

a second threshold value setting step setting a second threshold value in accordance with a change of an amount of noise overlapped with a processing result of the second subtracting step;

a second eliminating step eliminating frequency components included in a part of the processing result of the second subtracting step, the frequency components being larger than a predetermined frequency;

a second determining step determining if the processing result of the second subtracting step is over the second threshold value;

a second selecting step selecting one of the processing result of the second subtracting step processed by the second eliminating step and the processing result of the second subtracting step unprocessed by the second eliminating step in accordance with a determination result from the second determining step; and a second adding step adding a processing result of the second selecting step and a processing result of the first adding step, and wherein the measuring step measures the temperature distribution along the longitudinal direction of the optical fiber using the added data in the second adding step instead of the data selected in the first selecting step.

* * * * *